US011397824B2

(12) United States Patent
Racz et al.

(10) Patent No.: US 11,397,824 B2
(45) Date of Patent: *Jul. 26, 2022

(54) MEDIA STREAMING

(71) Applicant: GENETEC INC., St-Laurent (CA)

(72) Inventors: Pierre Racz, Montreal (CA); Frederic Rioux, Montreal (CA)

(*) Notice: Subject to any disclaimer, the term of this patent is extended or adjusted under 35 U.S.C. 154(b) by 51 days.

This patent is subject to a terminal disclaimer.

(21) Appl. No.: 17/123,950

(22) Filed: Dec. 16, 2020

(65) Prior Publication Data

US 2021/0248256 A1    Aug. 12, 2021

Related U.S. Application Data

(63) Continuation of application No. 15/776,436, filed as application No. PCT/CA2016/051358 on Nov. 21, 2016, now Pat. No. 10,915,647.

(Continued)

(51) Int. Cl.
*G06F 21/62* (2013.01)
*G06F 21/10* (2013.01)
(Continued)

(52) U.S. Cl.
CPC .......... *G06F 21/6218* (2013.01); *G06F 21/10* (2013.01); *G06F 21/602* (2013.01);
(Continued)

(58) Field of Classification Search
CPC ...... G06F 21/62; G06F 21/60; G06F 21/6218; G06F 21/10; G06F 21/602; H04L 9/08;
(Continued)

(56) References Cited

U.S. PATENT DOCUMENTS 5,757,909 A    5/1998  Park
5,799,086 A    8/1998  Sudia
(Continued)

FOREIGN PATENT DOCUMENTS

CA    2354351 A     3/2002
EP    1062812 A1    12/2000
(Continued)

OTHER PUBLICATIONS

Related Indian Patent Application No. 201817022860 Office Action dated Mar. 11, 2021.
(Continued)

*Primary Examiner* — Jayesh M Jhaveri
(74) *Attorney, Agent, or Firm* — Anglehart et al.

(57) ABSTRACT

A media playback system for presenting to a user a composition of a plurality of media streams. It has a media selection component configured to receive a scenario dataset, to receive user input for selecting viewing times defining segments of media and composition selections, and to output a list of segments of media from the scenario dataset that are authorized to be viewed by the user. The system has a playback control component configured to retrieve from media storage at least the segments of media from the output list of segments, to decode the segments of media, and to compile composition instructions. The system has a media playback component configured to receive the rendered media and the composition instructions.

35 Claims, 15 Drawing Sheets

Related U.S. Application Data

(60) Provisional application No. 62/257,966, filed on Nov. 20, 2015.

(51) Int. Cl.

| | | |
|---|---|---|
| *G06F 21/60* | (2013.01) | |
| *H04L 9/08* | (2006.01) | |
| *H04N 21/234* | (2011.01) | |
| *H04N 21/44* | (2011.01) | |
| *H04N 21/441* | (2011.01) | |
| *H04N 21/254* | (2011.01) | |
| *H04N 21/845* | (2011.01) | |
| *H04N 21/8547* | (2011.01) | |
| *H04L 9/40* | (2022.01) | |

(52) U.S. Cl.
CPC ........ *H04L 9/0825* (2013.01); *H04L 63/0457* (2013.01); *H04N 21/234* (2013.01); *H04N 21/23412* (2013.01); *H04N 21/2541* (2013.01); *H04N 21/441* (2013.01); *H04N 21/44012* (2013.01); *H04N 21/8456* (2013.01); *H04N 21/8547* (2013.01)

(58) Field of Classification Search
CPC ... H04L 9/0825; H04L 63/0457; H04N 21/44; H04N 21/234; H04N 21/23412; H04N 21/2541; H04N 21/44012; H04N 21/441; H04N 21/835; H04N 21/8456; H04N 21/8547

See application file for complete search history.

(56) References Cited

U.S. PATENT DOCUMENTS

| | | | |
|---|---|---|---|
| 6,052,466 A | 4/2000 | Wright | |
| 6,414,960 B1 | 7/2002 | Kuhn et al. | |
| 6,526,580 B2 | 2/2003 | Shimomura et al. | |
| 6,636,966 B1 | 10/2003 | Lee et al. | |
| 7,076,067 B2 | 7/2006 | Raike et al. | |
| 7,231,516 B1 | 6/2007 | Sparrell et al. | |
| 7,242,772 B1 | 7/2007 | Tehranchi | |
| 7,477,740 B2 | 1/2009 | Bennett | |
| 7,496,277 B2 | 2/2009 | Ackley et al. | |
| 7,508,941 B1 | 3/2009 | O'Toole, Jr. et al. | |
| 7,765,315 B2 | 7/2010 | Batson et al. | |
| 7,809,942 B2 | 10/2010 | Baran et al. | |
| 8,204,221 B1 | 6/2012 | Eshet et al. | |
| 8,275,718 B2 | 9/2012 | Pizano et al. | |
| 8,307,214 B2 | 11/2012 | Lundberg et al. | |
| 8,332,527 B2 | 12/2012 | Yan et al. | |
| 8,494,159 B2 | 7/2013 | Hampapur et al. | |
| 8,621,208 B1 | 12/2013 | Hu | |
| 8,712,045 B2 | 4/2014 | Dubhashi et al. | |
| 8,732,087 B2 | 5/2014 | Cohen et al. | |
| 8,767,961 B2 | 7/2014 | Chen et al. | |
| 8,832,758 B2 * | 9/2014 | Cook ................ | H04N 21/2225 725/86 |
| 8,891,773 B2 | 11/2014 | Henze et al. | |
| 9,356,985 B2 * | 5/2016 | Burckart ............ | H04L 67/1095 |
| 9,615,061 B2 * | 4/2017 | Carney ............ | H04N 21/47202 |
| 9,754,625 B2 * | 9/2017 | Lau ...................... | G11B 27/034 |
| 2001/0050990 A1 | 12/2001 | Sudia | |
| 2004/0005061 A1 | 1/2004 | Buer et al. | |
| 2004/0109569 A1 | 6/2004 | Ellison et al. | |
| 2004/0133908 A1 | 7/2004 | Smith et al. | |
| 2006/0078127 A1 | 4/2006 | Cacayorin | |
| 2007/0005795 A1 | 1/2007 | Gonzalez | |
| 2007/0153091 A1 | 7/2007 | Watlington et al. | |
| 2008/0034276 A1 * | 2/2008 | Ficco .................... | H04L 67/20 715/204 |
| 2009/0028343 A1 | 1/2009 | Sprunk | |
| 2009/0161869 A1 | 6/2009 | Chow et al. | |
| 2010/0158255 A1 | 6/2010 | Cheong et al. | |
| 2011/0072037 A1 | 3/2011 | Lotzer | |
| 2011/0119708 A1 | 5/2011 | Lee et al. | |
| 2011/0138486 A1 | 6/2011 | White | |
| 2011/0231660 A1 | 9/2011 | Kanungo | |
| 2012/0072723 A1 | 3/2012 | Orsini et al. | |
| 2012/0185693 A1 | 7/2012 | Chen et al. | |
| 2013/0271655 A1 | 10/2013 | Krahnstoever et al. | |
| 2013/0290845 A1 | 10/2013 | Rudman et al. | |
| 2013/0318347 A1 | 11/2013 | Moffat | |
| 2013/0343720 A1 * | 12/2013 | Abecassis ................ | H04N 5/76 386/239 |
| 2014/0098849 A1 | 4/2014 | Panich et al. | |
| 2014/0115626 A1 | 4/2014 | Sarda et al. | |
| 2014/0195651 A1 | 7/2014 | Stockhammer et al. | |
| 2014/0198252 A1 | 7/2014 | Pomprasitsakul et al. | |
| 2014/0270680 A1 | 9/2014 | Bloch et al. | |
| 2014/0334381 A1 | 11/2014 | Subramaniam et al. | |
| 2015/0220516 A1 * | 8/2015 | French ................ | G06F 16/9577 707/722 |

FOREIGN PATENT DOCUMENTS

| | | | |
|---|---|---|---|
| EP | 2575371 A1 | 4/2013 | |
| JP | 2003-009102 A | 1/2003 | |
| JP | 2003-309795 A | 10/2003 | |
| JP | 2005-506743 A | 3/2005 | |
| JP | 2005-354497 A | 12/2005 | |
| JP | 2006-517368 A | 7/2006 | |
| JP | 2007-041756 A | 2/2007 | |
| JP | 2012-248259 A | 12/2012 | |
| WO | WO 2002/073462 A1 | 9/2002 | |
| WO | WO 2012/068898 A1 | 5/2012 | |
| WO | WO 2015/113960 A1 | 8/2015 | |

OTHER PUBLICATIONS

Corresponding European application No. 16865364.0 European examination report and search opinion dated Jun. 16, 2021.
European application No. 16865364.0 supplementary European search strategy dated Mar. 28, 2019.
European application No. 16865364.0 written opinion dated Mar. 28, 2019.
European application No. 16865364.0 supplementary European search report dated Mar. 28, 2019.
Gilles Privat et al: "A Flex-1 compliant object compositing representation", 35. MPEG Meeting; Aug. 7, 1996-Dec. 7, 1996; Tampere; (Motion Picture Expert Group or ISO/IEC JTC1/SC29/WG11), No. M1026, Jul. 1, 1996. p. 1-4, 8, and figures 1,3,6.
International application No. PCT/CA2016/051358 International Search Report dated Mar. 28, 2017.
International application No. PCT/CA2016/051358 Written Opinion dated Mar. 28, 2017.
Japanese Patent Application No. 2018-526628 Office Action dated Nov. 4, 2020 and its English translation provided.
"Chapter 1: Overview of Cryptography ED—Menezes A J; Van Oorschot PC; Vanstone S A", Handbook of Applied Cryptography; [CRC Press Series on Discrete Mathematics and Its Applications], CRC Press, Boca Raton, FL, US, pp. 1-48, Oct. 1, 1996.
Feng-Cheng Chang et al: "Layered Access Control Schemes on Watermarked Scalable Media", The Journal of VLSI Signal Processing, Kluwer Academic Publishers, BO, vol. 49, No. 3, Jun. 28, 2007 (Jun. 28, 2007). pp. 443-455, XP019557804, ISSN: 1573-109X, DOI:.
Honggeun Kim et al: "An efficient implementation of RC4 cipher for encrypting multimedia files on mobile devices", Applied Computing 2007. The 22nd Annual ACM Symposium on Applied Computing—Mar. 11-15, 2007—Seol, South Korea, ACM—New York, NY, US. 11.
International application No. PCT/CA2016/051358 International Preliminary Report on Patentability Chapter I dated May 22, 2018.
International application No. PCT/CA2016/051358 Search Strategy dated Mar. 28, 2017.

* cited by examiner

MEDIA STREAMING

CROSS-REFERENCE TO RELATED APPLICATIONS

The present patent application is a U.S. continuation application of U.S. patent application Ser. No. 15/776,436 with a filing date of Nov. 21, 2016, that claims priority of U.S. provisional patent application No. 62/257,966 with a filing date of Nov. 20, 2015.

TECHNICAL FIELD

This application relates to the field of media data streaming.

BACKGROUND

There are numerous applications in which media streams, such as multimedia (e.g. audio, video) streams, are stored and retrieved for multiple users to receive with associated authorization mechanisms used to ensure that only authorized users have access to the streams. Some applications are in the field of security monitoring, and some applications are in the field of police investigation work.

Initially, security monitoring systems were only used to record, store and replay video and audio streams. These were the only capabilities provided by those analog video recording systems. Hence supported scenarios and corresponding system architectures were quite simple. Since the streams were available to anyone who had access to the recorder, physical access was mandatory to control access to the audio-video archives. Then some more advanced capabilities were added, such as text and shape overlays, multiple video feeds generated by a single camera, the juxtaposition of multiple cameras feeds in a single recording.

However, as security, privacy, collaboration, and storage requirements become more pressing, the complexity of security monitoring and investigation scenarios increases which result in more complex system architectures and implementations. For example, when privacy requirements ask for the encryption of all streams of a scenario (e.g. video, audio and any other metadata streams related to a specific location in a building) while having some streams made accessible to only a first group of users and some other streams accessible only to a second group of users, the access control of each stream versus the user who requests access becomes difficult to implement in traditional system architectures. This is because streams represent an unbounded quantity of information that varies over time. It can also be required that only a portion of a stream be granted to specific users, which the remaining of the stream cannot be accessed by the same users. Permissions could be granted to another group of users though, for the same stream. A user having access to a specific stream (or only a part of it) can also provide access to another user. However, traditional methods to achieve those scenarios imply the decryption and re-encryption of the complete data stream, which is a very resource consuming operation and is not an acceptable solution nowadays.

The challenges inherent in data stream distribution are further exacerbated by growing sensitivity about how personally identifiable information data (PII), embedded within streams of data, is accessed, shared, employed and retained by investigators. An investigator is a user who harbors an interest in examining the contents of, or information about, any combination of data streams (eg. a law enforcement agent, a prosecutor, a member of the security services or para-military organization, a security contractor, private investigator, a vendor contracted to enable forensic investigations or surveillance, a crime analyst, a marketing or business intelligence analyst, an automated system performing the functions of an investigator). Per the US Dept. of Commerce' NIST (Special Publication 800-122), PII is " . . . any information about an individual including (1) any information that can be used to distinguish or trace an individual's identity and (2) any other information that is linked or linkable to an individual . . . Linked information is information about or related to an individual that is logically associated with other information about the individual. In contrast, linkable information is information about or related to an individual for which there is a possibility of logical association with other information about the individual."

The data governance challenges inherent in data stream distribution may be further exacerbated in situations in which PII is captured by one party ("Originator") and provided to third parties for the aggregation, synthesis and sense-making of information contained in, or about, the data streams ("Aggregator"). By way of illustration, an Originator may be a social media service provider or a retail merchant, interested in ensuring that certain PII of their clients is accessed by Investigators only when there is a legitimate need to do so. Social media feeds containing PII information can then be encrypted by default while giving access to an anonymized version only. Providing to the public an anonymized version of the social media feeds can avoid profiling and other unauthorized uses.

As a consequence, modern systems must provide support for more complex scenarios which are harder to manage with current system architectures, mainly based on discrete blocs of data having database indexes as their only links between them. A more sophisticated architecture must be created to solve the new system requirements associated with those complex scenarios, for which examples are described herein. Disclosed is a system architecture based on streams of metadata, namely streams of data about the data (which may be other streams), in a way that can be easily used to collect, store, manage, and replay constituent streams of a logical scenario, those streams being stored asynchronously and synchronized when the scenario is rendered.

SUMMARY

Applicant has discovered that media streams can be organized as a hierarchical structure of data linking and synchronizing the media streams, so that streaming of the media can be handled as a number of separate streams from one or more servers to the destination node, and then allowing the destination node to handle synchronization of media stream data. In this arrangement, authentication to access the streams can be centralized or distributed among the stream servers.

Applicant has also discovered that streams can be encrypted using time-varying session keys, and the encrypted streams can be delivered along with symmetric session key streams to a destination node. The session key stream can be encrypted using an asymmetric key so that retrieval of the session keys contained in the session key stream requires the destination node to use a complementary key. The synchronization of the encrypted media stream and the session key stream can be achieved using a root stream that specifies to the destination node how to synchronize the streams, so as to apply correct session keys.

In this application, the term "stream" is used in accordance with its standard meaning of to transmit or receive data (especially video and audio material but can also be other types of data) over the Internet or other data network as a steady, continuous flow, with the understanding that a stream has inherently synchronization or time stamp data and that a stream can include data, such GPS coordinates, an image, image annotation or a text comment, that can be a series of events referenced in time.

BRIEF DESCRIPTION OF THE DRAWINGS

The invention will be better understood by way of the following detailed description of embodiments of the invention with reference to the appended drawings, in which.

DETAILED DESCRIPTION

Figure 1:
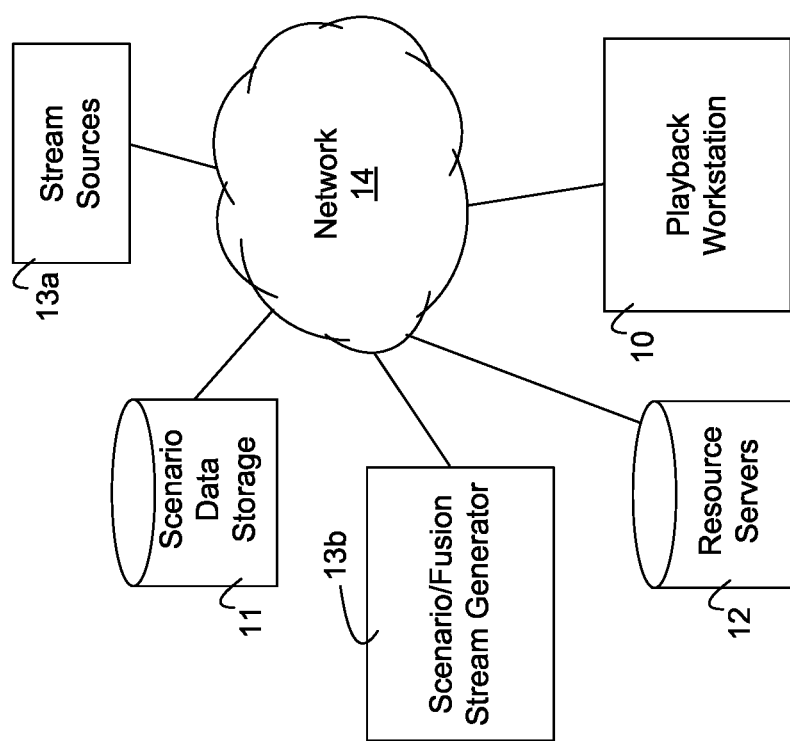
FIG. 1 is a schematic diagram of a computer network of devices able to implement a stream hierarchy having a root stream and a plurality of node streams.

As shown in FIG. 1, a playback workstation 10 is connected to servers 11 and 12 via a network 14. The workstation 10 can be a desktop computer, a tablet computer, smartphone, smart TV or the like. The server 11 is shown as hosting scenario data that guides the computer 10 in processing media streams from server or servers 12. The scenario data on server 11 can be co-hosted with the resource data on server 12. The servers 12 store files received from stream sources 13a, for example security video cameras, motion sensors, card readers, microphones, GPS, analytic systems, etc. The scenario or fusion stream data is generated either by a module 13b that is illustrated in FIG. 1 as being a separate component from the sources 13a, as may be the case. However, a source 13a can be adapted to generate segment files, elementary streams, fusion nodes and fusion streams. The components of the system in FIG. 1 are shown as all interconnected via a common network, however, it will be appreciated that direct connections and the use of separate networks for certain connections may be used.

Figure 2:
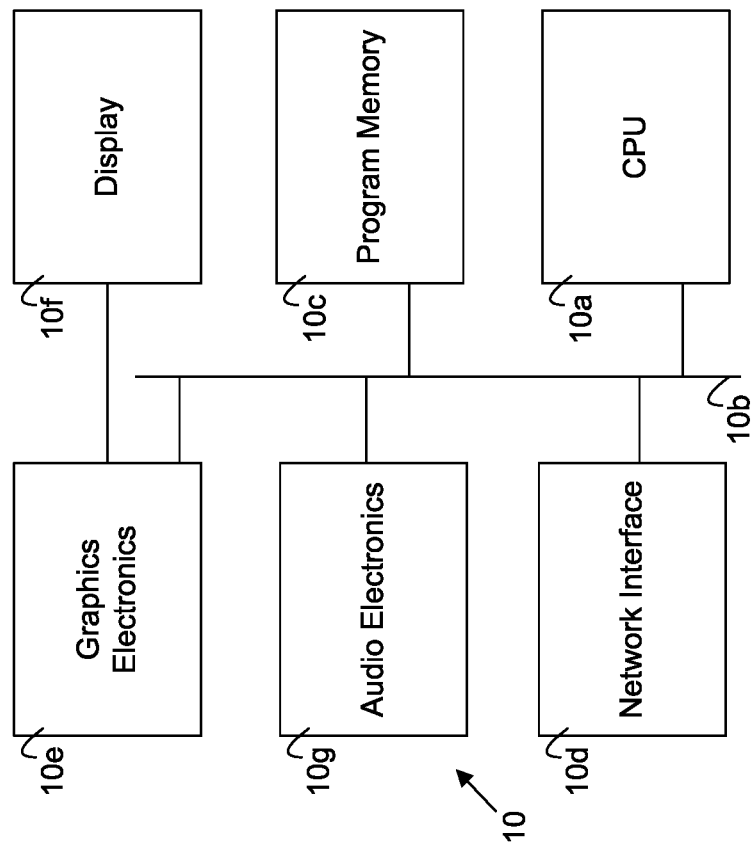
FIG. 2 is a schematic diagram of a playback workstation.

As shown in FIG. 2, the computer 10 can comprise a conventional computing platform. As illustrated in a non-limiting manner, the computer 10 can comprise a CPU 10a, a bus 10b, program memory 10c, a network interface 10d (wired or wireless), graphic hardware 10e, a display 10f and audio electronics 10g. The program memory 10c typically includes a suitable operating system and application programs.

Fusion Stream

Similar to a video stream that contains a sequence of frames providing the images to display or an audio stream containing audio data, a "fusion stream" can be defined as a versioned data stream made of a composition of elementary streams (or other fusion streams) for a given logical scenario that allows secure, traceable, and controlled collaboration and sharing. The fusion stream provides a series of "fusion nodes" containing the information needed to render the logical scenario, which can include video, audio, motion levels, bookmarks, overlays, events, permissions, encryption keys, etc.

There are two principal elements: 1) the fusion stream (made of fusion nodes) and 2) the elementary stream (made of segments). Both elements evolve in the streaming dimension (i.e. their data varies as a function of time). However, the fusion stream also has a composition versioning (i.e. its composition varies over time).

Figure 3:
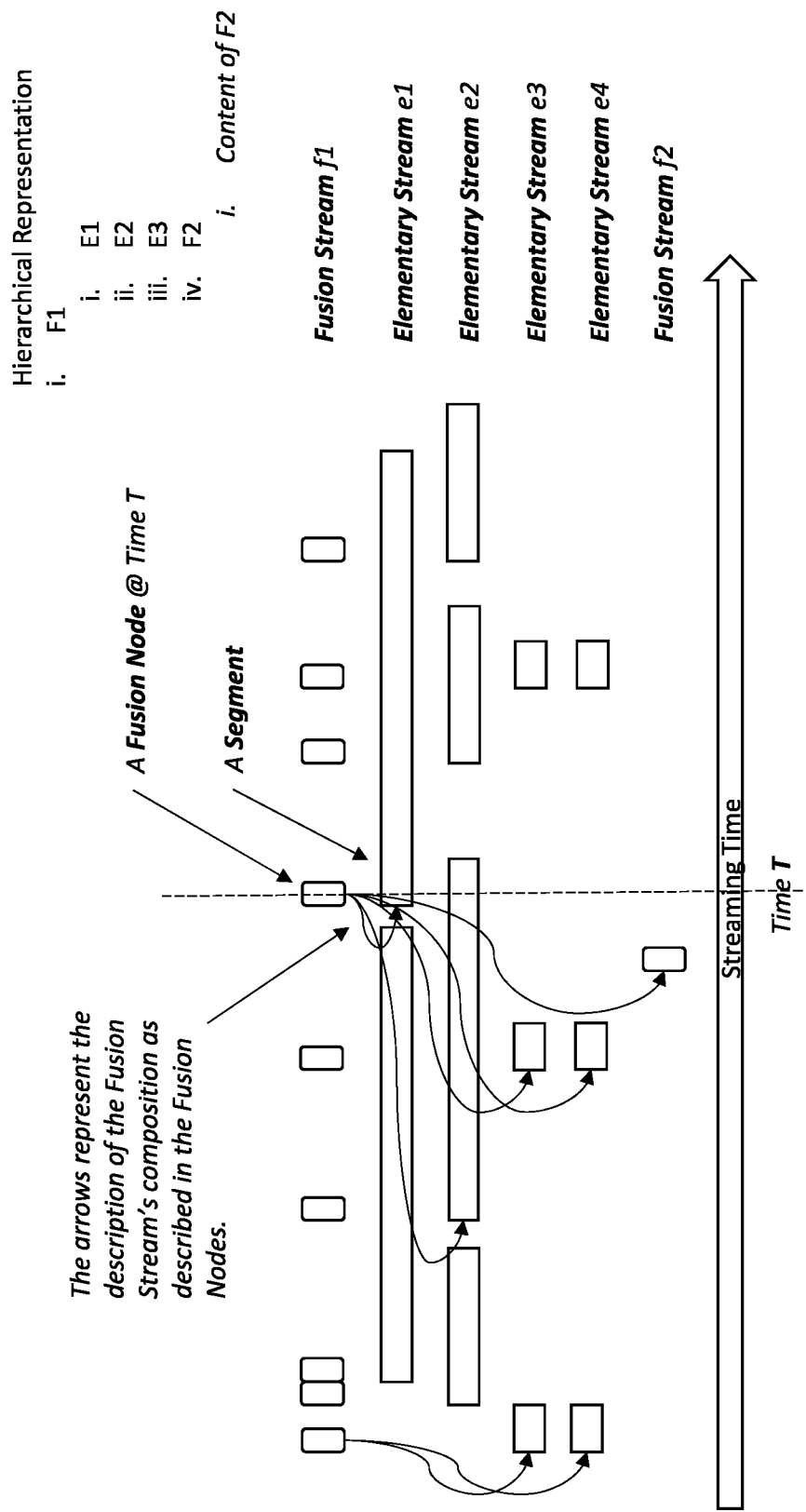
FIG. 3 is a schematic diagram of the architecture of fusion streams.

A fusion stream is a hierarchical data structure which elements are shown in FIG. 3 and are defined as follows:

Fusion stream: A logical composition of elementary streams (or other fusion streams) that varies over time (referred as the composition versioning). The fusion stream is made of an unbounded sequence of data made of a sequence of fusion nodes describing the composition of elementary streams of the fusion stream at a given time. Hence a fusion stream has a list of fusion nodes.

Fusion node: Logical entity that provides, for a specific time T of a scenario, a set of key-value pairs (attributes) and a list of segments. The segments belong to different elementary streams stored independently. Since a stream is an unbounded sequence of data, the fusion stream may be represented as a sequence of fusion nodes describing the composition of elementary streams of a scenario at any given time. A fusion node records the composition of the fusion stream at time T and all its segments that provide data for time T.

Elementary stream: Logical entity that provides the complete list of frames coming from a single source (camera, microphone, GPS, etc.) over all the streaming time. It is made of a list of segments from a unique source, where none of the segments overlap.

An elementary stream is characterized as follows:

Boundless, infinite, and purely accretive by nature (new data is always appended at its end, existing data is never modified).

Can be arbitrarily divided into finite segments which are immutable (i.e. their data will never change).

Originates from a unique source.

Contains data that varies as a function of time (e.g. streaming time).

Can provide no data for a given time.

Can also be another fusion stream.

Segment: Logical entity that contains a finite subset of the data (for example, a finite list of frames) composing an elementary stream. A segment has a start time and an end time. Typically, a segment corresponds to a file stored on disk and several segments are used to compose an elementary stream.

Therefore, for any point in time covered by the recording of a logical scenario (i.e. the streaming time dimension), the fusion stream provides:

The list of segments composing the scenario to be rendered.

The location of each segment; that is, where it is stored (server, disks, cloud platform, etc.).

Information on how to synchronize the segments to combine them appropriately.

When reference is made to the fusion stream by its identity, reference is made to the root element of the data structure. Its leaves can either be elementary streams or other fusion streams, in totality or in part.

In modern security monitoring and case investigation systems, the following key requirements are generally mandatory for any new deployment: privacy of information, collaboration between stakeholders, information sharing, storage scaling in cloud platforms, and logical grouping of information.

Privacy

All streams can be individually encrypted in the following way:

Data streams are encrypted with a randomly generated symmetric key that changes periodically.

The resulting sequence of symmetric keys (a.k.a. the master key stream) is then encrypted with the public key (asymmetric encryption) of the person to whom a viewing permission over that stream should be granted.

The resulting stream of that encryption process is a client-specific key stream.

There can be as many client-specific key streams as there are persons to whom viewing permission should be granted.

If a viewing permission must be limited to a given sequence (portion of a stream), the length of the client-specific key stream can be limited by only encrypting a subset of the master key stream. This gives a very granular control on who can see what content.

The encrypted data streams and the associated key streams for each person who is granted permission to access one or more streams are combined under a logical scenario implemented by a fusion stream.

Collaboration

There are two important time dimensions associated with the fusion stream:

The streaming time as recorded by the fusion nodes. For example, at streaming time T, the fusion stream is composed of streams A, B and C.

The fusion stream version (composition versioning), because the fusion stream can accrete new streams and its composition can change over time. For example:

V1: at streaming time T, the fusion stream is composed of streams A, B and C, which represents version 1 of the fusion stream.

V2: at streaming time T (same time as V1), the fusion stream is now composed of streams A, B, C and D, which represent the version 2.

By ingesting new streams or deriving new ones (e.g. creating new client-specific key streams, a posteriori analytics, etc.), the composition of the fusion stream can evolve over time for the same time T.

The versioning of the fusion stream acts as a built-in audit trail, which is a desirable feature when it comes to collaboration. It also enables rolling back an undesirable modification (just like in a source control manager or Wikipedia).

Sharing

The privacy and collaboration key requirements enable sharing in which new client-specific key streams can be created and accreted to the fusion stream. The sharing granularity allows giving only access to a subset of the elementary streams of the fusion stream as well as giving only access to limited time spans within these streams. Client-specific key streams, just like any other streams, can be added, replaced or removed by changing the version of the fusion stream.

Cloud Scaling

Fusion nodes describe the composition of the fusion stream by pointing to segments that do not need to be collocated. A large quantity of elementary streams can be encrypted and stored on a cloud platform in a way that their confidentiality is not compromised even if they are accessed by unauthorized people.

Segments are immutable by nature and, assuming a cloud-friendly object storage, can be reused by many fusion streams (e.g. Body Wearable Cameras (BWC) recordings can belong to more than one logical scenario). The focus on the collaboration between stakeholders and the fusion stream versioning renders the segments very cloud platform friendly, that is, they can be stored securely on servers that are in fact untrusted.

Logical Grouping

A fusion stream purposely regroups independent elementary streams under a single logical scenario, whether is it a case under investigation, data associated with a unique officer, data from fixed cameras following a moving vehicle throughout the city, etc. An elementary stream, or some of its segments, can be referenced by more than one fusion stream concurrently.

A fusion stream can have two parts:
1. A definition
2. A list of fusion nodes (composition).

A fusion stream can be defined in any markup language format that can be read by humans and machines, but for the purpose of describing this invention, the JSON format is used in this example to define the structure of a fusion stream.

Structure of a Fusion Stream:

```
{
    "fusion-guid": "a79ca040-4135-11e5-b118-0002a5d5c51b",
    "fusion-composition-version": 1,
    "short-name": "Front door",
    "description": "Recordings pertaining to the front entrance of the main building on St-John street (building 24)"
    "creation-date": "2008-05-26 20:32",
    "created-by": "userA",
    "read-permission-level": 50,
    "write-permission-level": 50,
    "tags": ["building 24", "door"]
    "fusion-nodes": ["ef7863ee-30c2-43c4-ae6d-5cdf4229c638",
    "4b63219d-2ec6-42cb-a274-02b2b8bb0a46", ...]
}
```

As shown above, the definition of a fusion stream provides static information about a scenario; that is, key-value attributes that remain identical for any dependent fusion node that is part of the fusion stream. For example, the short-name, description and creation-date attributes are not likely to change when seeking at a specific time within a fusion stream.

The definition provides the following attributes:

fusion-guid: Unique identifier of the fusion stream.

fusion-composition-version: Current version of the fusion stream. It relates to the fusion stream versioning used to track the changes made to it over time.

short-name and description: Textual information typically entered by a user to classify and find the recordings more easily.

creation-date: Date and time when the fusion stream was created.

created-by: User who created the fusion stream.

read/write-permission-level: Access rights needed to read and modify the fusion stream.

tags: Properties used by the system to classify the fusion stream according to system and application-specific requirements (for example, the type of entities associated with the fusion stream in the system).

Figure 4:
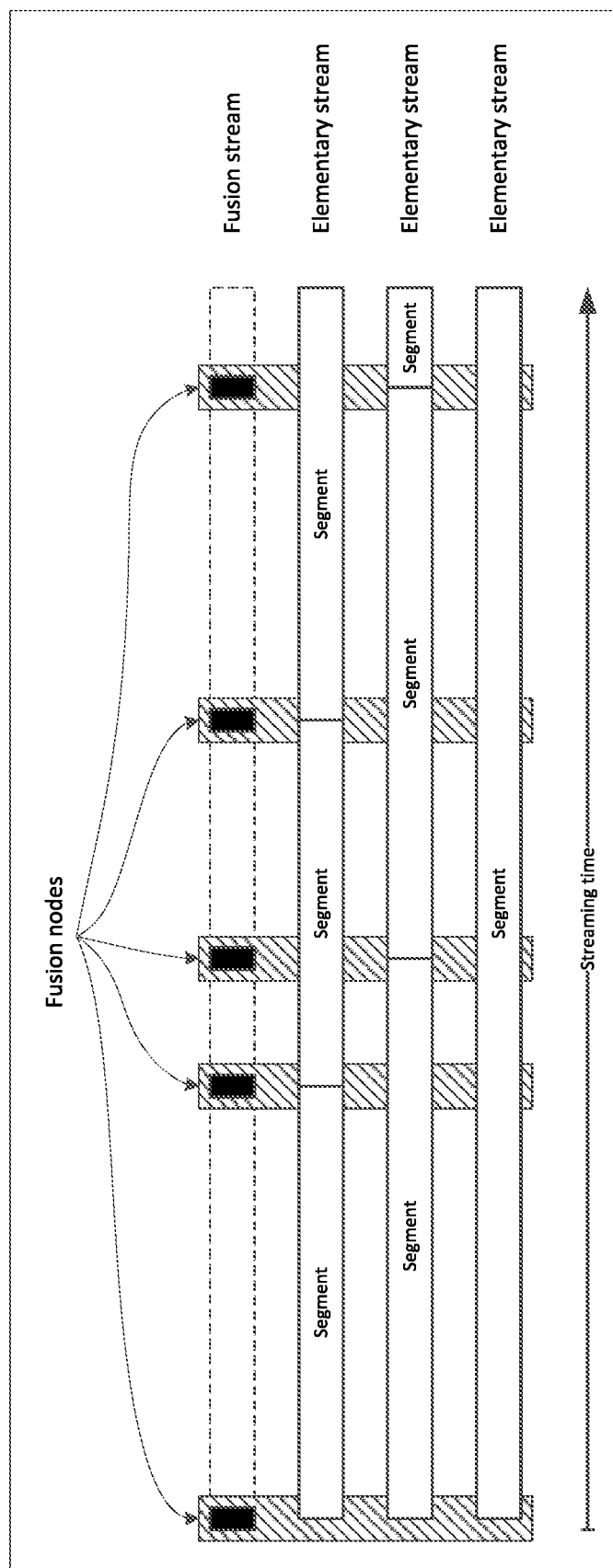
FIG. 4 is a schematic diagram of exemplary fusion nodes.

Fusion nodes on the other hand provide dynamic information about the scenario; that is, its composition at a specific time TX when the scenario is rendered. A fusion node contains a list of segments, each one belonging to a different elementary stream. FIG. 4 is a schematic diagram of an example of a fusion stream having five fusion nodes and related elementary streams having segments. A fusion node records the composition of the fusion stream at time TX; that is, all the associated segments that provide data for time TX. If the clock of each stream is not fully synchronized with the others, the fusion node is the place where the time offset of a segment with respect to the streaming time of the fusion stream can be stored.

A fusion stream can have a single node when the recording is very short, but generally has multiple nodes to take into account the various segments used to store elementary streams (for example, a video stream recorded with multiple files, each one containing 20 minutes of video, one file corresponding to one segment). Audio segments could contain data for a different period of time, as for other types of streams.

Below is an example of a fusion node that contains a video segment and an audio segment for a finite time period:

Structure of a Fusion Node:

Each fusion node provides the following attributes:

fusion-node-guid: Unique identifier of the fusion node.

streaming-time: Time at which the composition of the fusion node takes effect in the scenario being rendered. Before this time the composition of the previous fusion node applies and after this time, another fusion node may apply according to its streaming-time value.

segments: List of segments composing the fusion node.

stream-guid: Unique identifier of the elementary stream that owns the segment.

segment-guid: Unique identifier of the segment.

URI: Location of the segment (ex. server name, path, filename).

SHA-1: Hash value representing the signature of the segment. This is typically used to create a unique storage path for the segment.

start-time: Earliest time for which the segment can provide data.

end-time: Latest time for which the segment can provide data.

Optionally, a fusion node may provide one or more composition attributes. As a non-limiting example, a still image that is to be superposed over a video stream can have as its composition attribute a scaling parameter and a coordinate of where the image is to appear within another frame. In the case of GPS coordinates, the size of the characters and the location within another image frame where the characters should appear and any contrast with respect to a background can be specified in the fusion node. It is also possible that the composition attributes include a specification of the other fusion node to be combined or blended. At the time of playback or rendering, the user may be given a chance in the interface to change the composition parameters to provide for a more effective combination of streams.

By including composition attributes in the fusion stream (and in fusion nodes), the author of the fusion stream defines not only the streams that are to be combined, but also the suggested or mandatory way in which streams are to be combined when rendered. In some cases, a particular result or effect is achieved in the nature of the combination that is not inherent in the mere selection of the segments, and the author of the fusion stream is provided with the mechanism to specify the desired or suggested combination so that the result or effect can be achieved. This also provides a flexible

```
{
    "fusion-node-guid": "ef7863ee-30c2-43c4-ae6d-5cdf4229c638",
    "streaming-time": ["2008-05-26 23:20"]
    "segments": [
    {
        "stream-guid": "169615c1-3271-4f9c-9d43-5f704e03c383",
        "segment-guid": "acd01432-0d1c-47a0-bdba-c043065d68c3",
        "URI": "cloudarchiving.genetec.com/archives/a5c6cb5e-1e3c-4a3a-862d-cfd47d4781a0/169615c1-3271-4f9c-9d43-
            5f704e03c383/200805262320.h264",
        "SHA-1": "31017a722665e4afce586950f42944a6d331dabf",
        "start-time": "2008-05-26 23:20",
        "end-time": "2008-05-26 23:40"
    },
    {
        "stream-guid": "f2791dfc-3f7f-4ec5-bc68-84fad216897b",
        "segment-guid": "d3fd4e74-1082-4369-98ad-fcadedff97c9",
        "URI": "cloudarchiving.genetec.com/archives/a5c6cb5e-1e3c-4a3a-862d-cfd47d4781a0/f2791dfc-3f7f-4ec5-bc68-
            84fad216897b/200805262320.g711",
        "SHA-1": "4af35608979b6211011dafl6fdd4ef09e679f205",
        "start-time": "2008-05-26 23:20",
        "end-time": "2008-05-26 23:40"
    }
    ]}
``` architecture for the development of new system capabilities as new requirements are introduced.

A second fusion node for the same fusion stream can look like the one below (with modified attributes highlighted in bold):

A Second Fusion Node of the Same Fusion Stream:

```
{
    "fusion-node-guid": "4b63219d-2ec6-42cb-a274-02b2b8bb0a46",
    "streaming-time": ["2008-05-26 23:40"]
    "segments": [
    {
        "stream-guid": "169615c1-3271-4f9c-9d43-5f704e03c383",
        "segment-guid": "90d18c49-2c64-4c89-ac20-08d9c42ebfe7",
        "URI": "cloudarchiving.genetec.com/archives/a5c6cb5e-1e3c-4a3a-862d-cfd47d4781a0/169615c1-3271-4f9c-9d43-
            5f704e03c383/200805262340.h264",
        "SHA-1": "6d8349de019ae57e007b48890941aef836459adc",
        "start-time": "2008-05-26 23:40",
        "end-time": "2008-05-27 00:00"
    },
    {
        "stream-guid": "f2791dfc-3f7f-4ec5-bc68-84fad216897b",
        "segment-guid": "33b36461-c228-4041-b73b-5e21ff08ba52",
        "URI": "cloudarchiving.genetec.com/archives/a5c6cb5e-1e3c-4a3a-862d-cfd47d4781a0/f2791dfc-3f7f-4ec5-bc68-
            84fad216897b/200805262340.g711",
        "SHA-1": "c223078001b66becb31c6ee2598b1b9473e6a6f0",
        "start-time": "2008-05-26 23:40",
        "end-time": "2008-05-27 00:00"
    }
]}
```

It should be noted that many other attributes can be added to the structure of the fusion stream and the structure of the fusion node to adapt the invention to any new application, scenario or requirement being addressed. The user interface may also be adapted to give users access to the new capabilities developed to address the new application, scenario or requirement.

It should also be noted that both fusion streams and fusion nodes can be stored in a database to facilitate the storage and the query of specific ones. They can also be stored as files on disks, which file identifiers are indexed in databases. Because the content of a fusion stream is negligible when compared to other data streams (typically video and audio), it provides a flexible and scalable solution to store complex scenarios when using a database.

The way for an application (ex. player, viewer, editor) to get and manipulate the data a fusion stream provides will be described. A programming interface may be used by a software application to use the fusion stream as a data structure. If a client application needs to work with data streams to record, modify or playback a logical scenario, the fusion stream may be used through a programming interface, such as the programming interface illustrated in FIG. 14. The backend may manage the archiving on disk, retention periods, encryption and streaming. In some embodiments, the client application may not need to manage those capabilities as those capabilities are managed by the backend.

An application that accesses a fusion stream to render its scenario, knowing the identity of the fusion stream to be retrieved, a streaming time TX for which the scenario is to be rendered and a version of the composition (which is optional), can retrieve the list of all segments that are part of the composition so that it is possible to combine and render these segments.

For example, a security officer wants to retrieve the recording made last night around 23:30 from a camera. The recording includes a video recording and an audio recording, both of them referenced by a single fusion stream. To achieve this, the player application will query the system for the recording made at 23:30 from this camera. A list of fusion streams can be returned to the user, who can select the fusion stream associated with the proper recording. Using the fusion stream ID and invoking the GetFusionStreamInfo method, the player can retrieve the fusion stream definition and display it to the user.

GetFusionStreamInfo(guid FusionID, int CompositionVersion)

If CompositionVersion is not provided, the system will return the latest version of the fusion stream. The CompositionVersion value provided in the method corresponds to the specific version of the fusion stream's composition stored in the fusion-composition-version attribute. Every time the composition is modified, for example when an elementary stream is added, the fusion-composition-version value is incremented to provide a unique version number. Considering that fusion nodes represent immutable data entities and that they are never modified, new fusion nodes are created to store the changes, therefore providing the capability to track the changes made to fusion streams over time. It can then be possible to retrieve older versions of a fusion stream when required, whether you want to discard recent changes or provide an audit report.

The user can then click play to start rendering the scenario. At this time, the player can invoke the GetFusionStreamComposition method to get the composition of the fusion stream at 23:30; that is, the fusion node that contains the specific segments needed to render the scenario for TX=23:30.

etFusionStreamComposition(guid FusionID, DateTime StreamingTime, int CompositionVersion)

Again, if CompositionVersion is not provided, the system will return the latest version.

The GetStreamInfo method is also used to get the type of segment (or elementary stream) that the player must render:

GetStreamInfo(guid StreamID)

For example, the method will return the following structure for a video steam and for an audio stream respectively:

Example of Video Stream Information

```
{
    "stream-guid": "169615c1-3271-4f9c-9d43-5f704e03c383",
    "encoder-guid": "5f30c838-e382-4ab9-9e60-00115a081abe"
    "origin-guid": "a5c6cb5e-1e3c-4a3a-862d-cfd47d4781a0"
    "media-type": "unencrypted video (H.264)"
    "usage": "high resolution video"
}
```

Example of Audio Stream Information

```
{
    "stream-guid": "f2791dfc-3f7f-4ec5-bc68-84fad216897b",
    "encoder-guid": "02026c5d-0fcc-4bdf-85b9-103d56b32676"
    "origin-guid": "a5c6cb5e-1e3c-4a3a-862d-cfd47d4781a0"
    "media-type": "unencrypted audio (G.711)"
    "usage": "audio"
}
```

The GetStreamSegments method can also be useful to retrieve all segments of an elementary stream for a bounded period of time:
GetStreamSegments(guid StreamiD, DateTime FromDateTime, DateTime ToDateTime)

The method will return the list of segments of which a given elementary stream is made of. In the example below, a query is made for the segments available between 23:30 and 00:10.

```
{
    "stream-guid": "169615c1-3271-4f9c-9d43-5f704e03c383",
    "segments": [
    {
        "segment-guid": "acd01432-0d1c-47a0-bdba-c043065d68c3",
        "URI": "cloudarchiving.genetec.com/archives/a5c6cb5e-1e3c-4a3a-862d-cfd47d4781a0/169615c1-3271-4f9c-9d43-
            5f704e03c383/200805262320.h264",
        "start-time": "2008-05-26 23:20",
        "end-time": "2008-05-26 23:40"
    },
    {
        "segment-guid": "e0985c6b-eff7-430d-afb0-19df39916fe5",
        "URI": "cloudarchiving.genetec.com/archives/a5c6cb5e-1e3c-4a3a-862d-cfd47d4781a0/169615c1-3271-4f9c-9d43-
            5f704e03c383/200805262340.h264",
        "start-time": "2008-05-26 23:40",
        "end-time": "2008-05-27 00:00"
    },
    {
        "segment-guid": "06e07249-7b87-4320-9cbd-26ed17a803d8",
        "URI": "cloudarchiving.genetec.com/archives/a5c6cb5e-1e3c-4a3a-862d-cfd47d4781a0/169615c1-3271-4f9c-9d43-
            5f704e03c383/200805270000.h264",
        "start-time": "2008-05-27 00:00",
        "end-time": "2008-05-27 00:20"
    }
    ]
}
```

Having defined the structure of the fusion stream and the fusion node, as well as methods that can be used to retrieve them, examples will be described of how fusion streams can be implemented so that the system, the editor and the player applications can work with fusion streams and interpret them.

Basic Scenario: Recording Data Streams

The primary goal of a video surveillance system is to record video streams transmitted by surveillance cameras for the purpose of archiving and playing back the recordings in case an event occurs and evidence must be found. With fusion streams, the system still records the elementary streams (ex. video, audio) from the stream sources 13a as before, however at the same time, module 13b creates and records a fusion stream that becomes the new entry point (or root node) for the recording of the scenario.

In the present basic scenario, the system is automatically configured to record a video stream, an audio stream and a metadata stream (in this example GPS coordinates). These are all part of stream sources 13a in the diagram of FIG. 1. A camera can be installed in a city bus to record video, while the audio and GPS coordinate streams can be generated by separate devices installed in the same bus. When recording each elementary stream, module 13b of the system also records a fusion stream by creating multiple fusion nodes to reference the segments involved. Each segment references a file that contains a certain amount of data, therefore a finite period of time.

Shown below is a fusion stream with the node that is returned when seeking for data between 22:55 and 23:05, which is the time span of the current fusion node bounded by the previous and the next fusion nodes. In this example the next fusion node starts at 23:05. It also shows that the server cloudarchiving.genetec.com can be queried to retrieve the segments.

Fusion Stream:

```
// fusion stream
{
    "fusion-guid": "dce326c2-bd4c-4d53-98dd-2ec612ce2ce4",
    "fusion-composition-version": 1,
    "short-name": "Bus #1"
```

-continued

```
    "description": "Video, audio and position recordings pertaining to
city bus #1"
    "creation-date": "2015-08-13 21:00"
    "created-by": "system"
    "read-permission-level": 0
    "write-permission-level": 0
    "tags": ["bus1", "video", "audio", "gps-position"]
    "fusion-nodes": ["f34e1aa5-129d-4a66-95b3-d9d436463d0a"]
}
```

Fusion Node:

```
{
    "fusion-node-guid": "f34e1aa5-129d-4a66-95b3-d9d436463d0a",
    "streaming-time": ["2015-08-13 22:55"]
    "segments": [
    {
        "stream-guid": "5f102713-5a65-4f84-90d5-2ef212b0383c",
        "segment-guid": "e4c119dd-bae1-4edd-9729-1012143fddfc",
        "URI": "cloudarchiving.genetec.com/archives/2b42299c-771e-4b57-a671-663c3cb7962c/5f102713-5a65-4f84-90d5-
            2ef212b0383c/201508132250.h264",
        "SHA-1": "da39a3ee5e6b4b0d3255bfef95601890afd80709",
        "start-time": "2015-08-13 22:50",
        "end-time": "2015-08-13 23:05"
    },
    {
        "stream-guid": "7a663afb-0f06-41e4-9fad-9ad2dcf811fb",
        "segment-guid": "063ca43d-a8d1-4e7d-874d-7ecaecbd13cc",
        "URI": "cloudarchiving.genetec.com/archives/a5c6cb5e-1e3c-4a3a-862d-cfd47d4781a0/7a663afb-0f06-41e4-9fad-
            9ad2dcf811fb/201508132255.g711",
        "SHA-1": "4813223c33d7ca09493489b6e2f458c5e1f95806",
        "start-time": "2015-08-13 22:55",
        "end-time": "2015-08-13 23:15"
    },
    {
        "stream-guid": "9ea22729-fe14-48cc-8436-76e95770f683",
        "segment-guid": "f87dbbd8-3167-4b0c-b22d-82b2dcb38fc7",
        "URI": "cloudarchiving.genetec.com/archives/a5c6cb5e-1e3c-4a3a-862d-cfd47d4781a0/9ea22729-fe14-48cc-8436-
            76e95770f683/201508132235.gps",
        "SHA-1": "bdfbafd72af00e08dfb2609559b1e2c62a2492dc",
        "start-time": "2015-08-13 22:35",
        "end-time": "2015-08-13 23:20"
    }
]}
```

Figure 5:
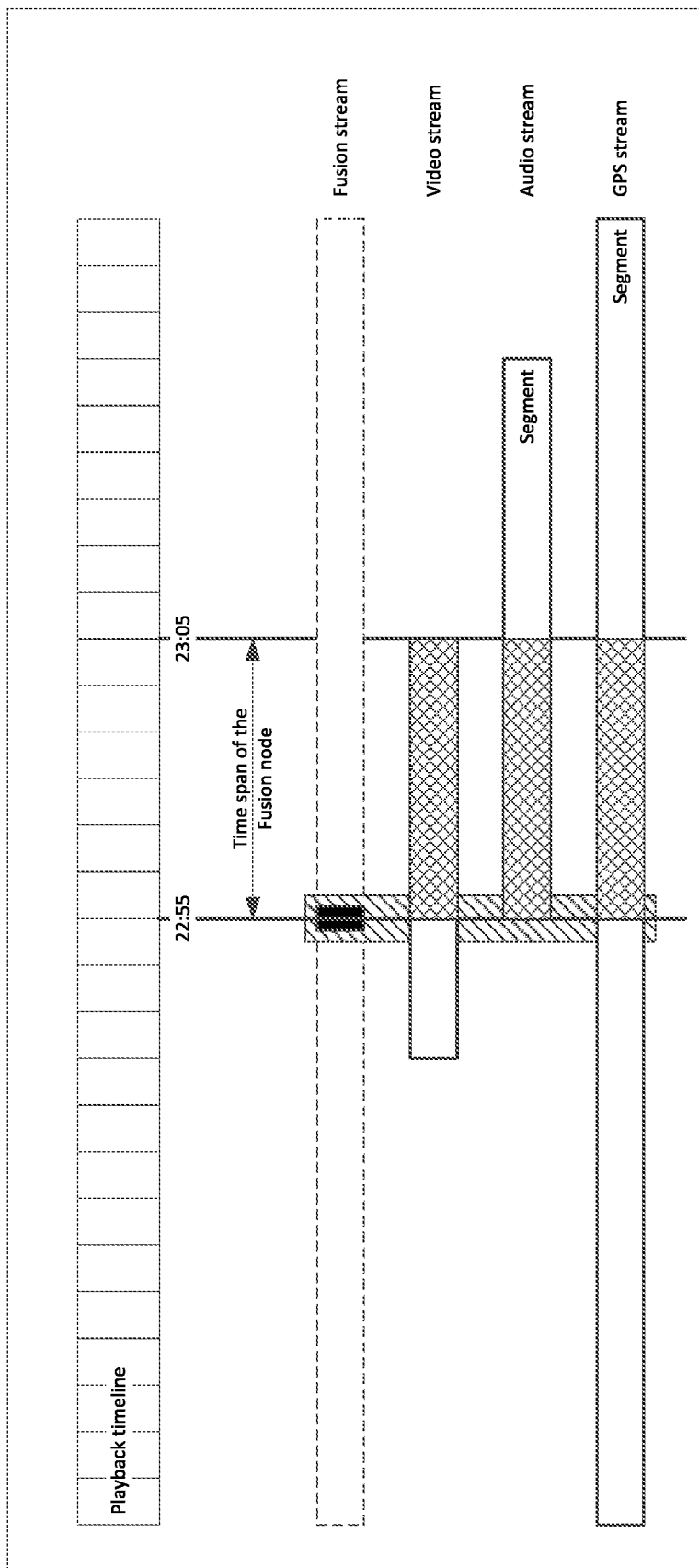
FIG. 5 is a schematic diagram of a time span of a fusion node.

FIG. 5 is a schematic illustration of the time span of the fusion node.

The Scenario/Fusion Stream Generator 13b may be a software component for maintaining and managing the storage of fusion streams in a security monitoring system. Module 13b may be built on the core archiving component of a security monitoring system.

Figure 16:
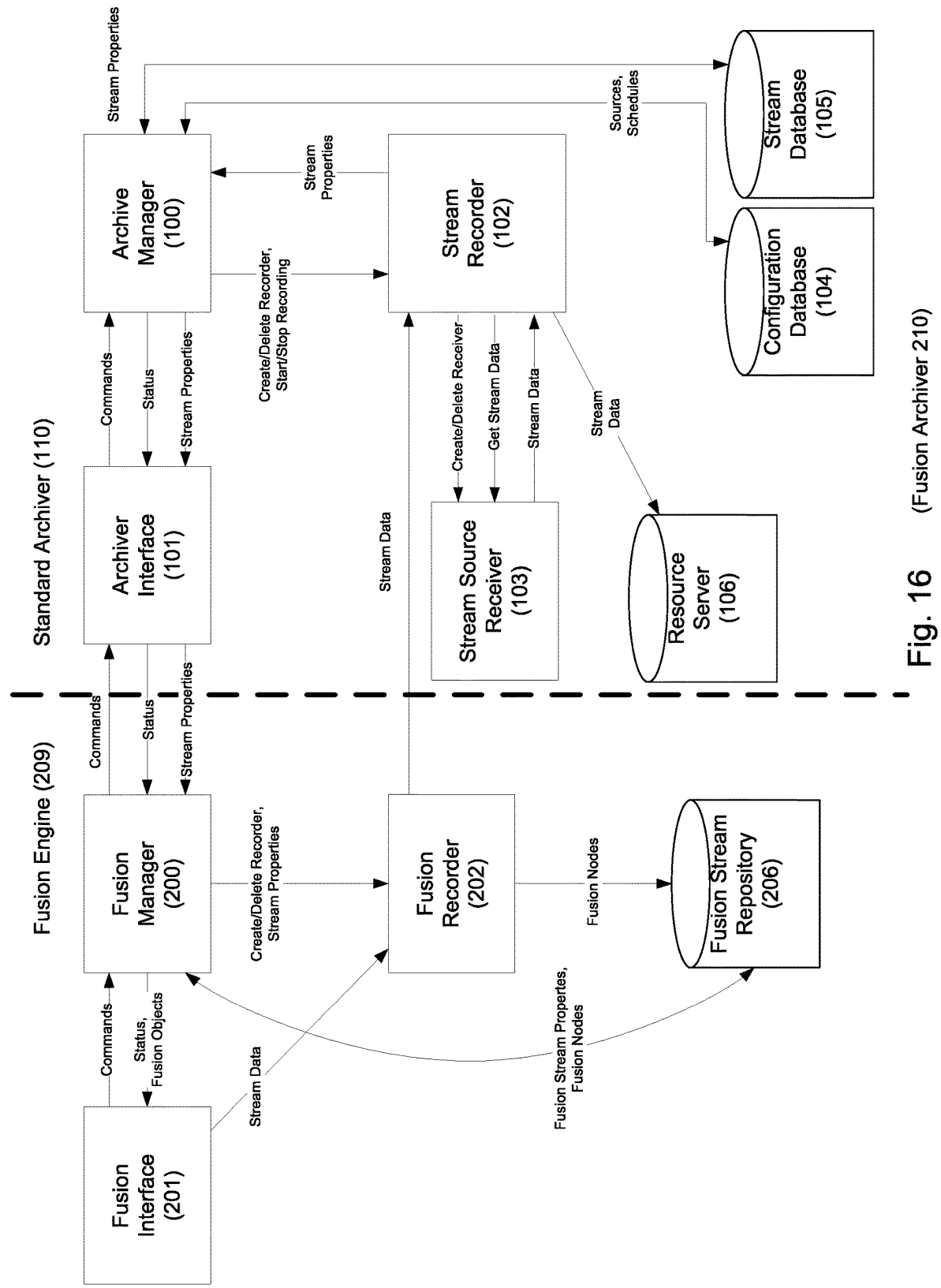
FIG. 16 is a schematic diagram showing exemplary architecture of the fusion archiver taking advantage of the capabilities of the standard archiver adapted for fusion streams.

Reference is now made to FIG. 16, illustrating an exemplary fusion archiver 210, an adapted core archiving component of a security monitoring system adapted for supporting fusion streams. The fusion archiver 210 has a fusion engine 209 and a standard archiver 110. The standard archiver 110 is used to record video streams, audio streams, and other data streams (e.g. video analytics) from source devices, typically video and audio encoding devices. The standard archiver 100 may be used to specify which devices to record, which specific streams to record when multiple streams (e.g. H.264, MPEG-4, MJPEG) are available from a device, which schedules to use for the recording, if the recordings is to be protected from automatic deletion when the disk space becomes insufficient, and if the recordings are to be duplicated to another standard archiver 110 to provide redundant archiving. These are all the important capabilities currently provided by the standard archiver 110. Disk management is also another capability provided by the standard archiver 110. When archives are being recorded, at some point the disk space may become insufficient for newer recordings to be stored. The standard archiver 110 may provide configuration options to decide if older recordings are to be automatically deleted from the disk whenever space becomes insufficient for new recordings. In some embodiments, the configuration options also allow to move oldest recordings to another backup storage device. In some embodiments, new recordings may simply be discarded when the disk is full, which in this case would result in a system alert for requesting immediate response.

Figure 15:
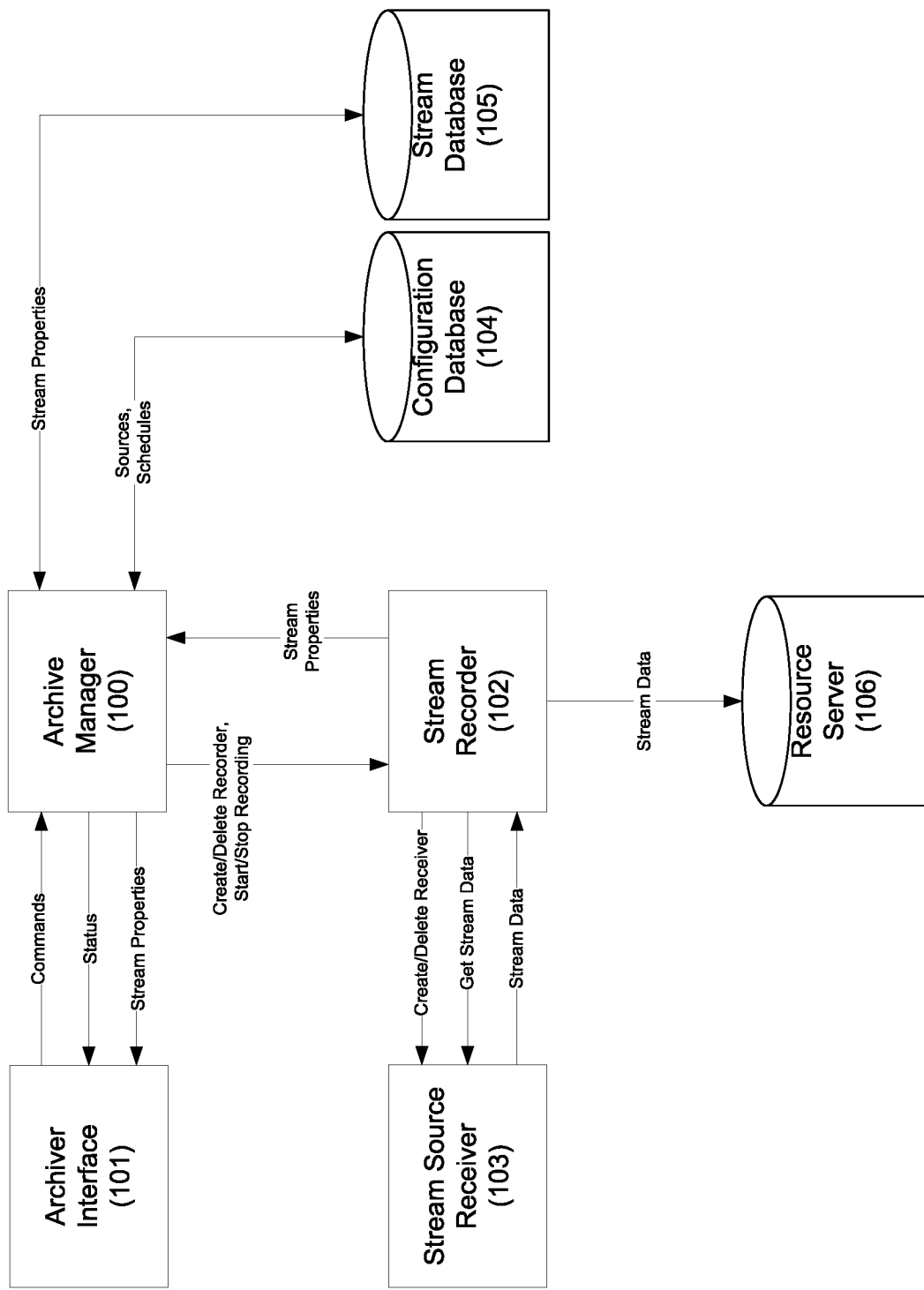
FIG. 15 is a schematic diagram showing exemplary architecture of the standard archiver used to record audio and video streams.

FIG. 15 shows the inner components of an exemplary standard archiver 110 involved in recording data streams from source devices. The conductor of the standard archiver 110 is the archive manager 100. The archive manager 100 may be configured with a list of source devices and one or multiple streams from each source device to record, the list maintained by the archive manager 100 in the Configuration Database 104. The archive manager 100 may also be configured with a list of recording schedules pertaining to each source. The list of recording schedules pertaining to each source is also maintained in the configuration database 104. These configuration parameters are received from a client application through archiver interface 101. The client application may be, for example, an application with a user interface that collects the configuration parameters from a user. The client application may also be a file reader that reads the configuration parameters from a file and transmits them to archive manager 100 through archiver interface 101. In some other embodiments, the client application may be another component of the security monitoring system that requires the configuration to be changed. In these other embodiments, the configuration parameters may be transmitted through the archiver interface 101. The archive manager 100 may start and stop the recording automatically according to the configured recording schedules maintained in the configuration database 104. The archive manager 100 may also start and stop the recording following a command received from the archiver interface 101. Such commands may be generated when a user manually starts and stops a recording using a client application or when a recording is started when a specific event is triggered in the security monitoring system. In such cases, the client application may be an event handling module configured to start a recording when an event is received. Anytime a recording is started, whether automatically by the archive manager 100 or manually by a command received from the archiver interface 101, the archive manager 100 creates a stream recorder 102 to handle the recording. The archive manager 100 provides the URL of the source device with the identity of the stream to record. While recording, the archive manager 100 receives in real time from the stream recorder 102 the stream properties and stores them in the stream database 105. The stream properties include the URL of each segment file created by stream recorder 102, the type of stream recorded (video, audio, masking, text, etc.), the stream size in bytes and its length in time. Stream properties can also include protection and duplication indicators as well as links with other streams, for example an audio stream associated with a video stream. Such information stored in the stream database 105 can later be used when the standard archiver 110 is queried through the archiver interface 101 to return the list of archives available on disk.

Client applications use archiver interface 101 to configure and operate the archive manager 100. The archiver interface 101 may receive commands to add and delete sources, add and delete recording schedules, select streams to record for each source, start and stop recordings, etc. Archiver interface 101 can also return the status of each command. This can be done using a Boolean value indicating that the command was successful or could not be executed, in which case an error condition is returned with the indication. Through archiver interface 101 a client application can also query the Archive Manager 100 for the current configuration parameters stored in the configuration database 104, the stream properties stored in the stream database 105 or the archive files themselves stored by the resource server 106. The stream database 105 provides the details about which resource server 106 stores each file pertaining to a recording. Through archiver interface 101 an application can also manually start a recording. When starting a recording, archive manager 100 may create a stream recorder 102 to manage the storage of the stream data, which in turn stream recorder 102 may create a stream source receiver 103 to receive the data from the source. The standard archiver 110 may also request archives for playback purposes (not shown).

The Standard Archiver 110 may provide one or more instances of stream recorders 102 to manage the recording of a data stream from a source. For each stream to record from a source, archive manager 100 creates a stream recorder 102 by passing the URL of the source and the specific stream to record. Thus, there is one stream recorder 102 instance per stream to record from a unique source. The stream recorder 102 manages the storage of the stream data. The stream recorder 102 creates the segment files during the recording, each file containing a portion of the stream, and the stream recorder 102 returns those stream properties to archive manager 100 which stores them in stream database 105. The stream recorder 102 in turn creates a stream source receiver 103 to connect to the source using the URL and to receive the stream data from it. The stream source receiver 103 has a data buffer used to temporarily store the stream data upon a request received from the stream recorder 102 to obtain the data. At this moment, the stream source receiver 103 returns the data temporarily stored in its data buffer to the stream recorder 102, which in turn stores the data in the current segment file created on the resource server 106. The stream source receiver 103 maintains the connection to the source, receives and temporarily stores the stream data, and returns the stream data until the stream source receiver 103 is deleted by the stream recorder 102, this deletion of the stream source receiver 103 by the stream recorder 102 occurring before the stream recorder 102 is itself deleted by the archive manager 100 when the recording is stopped.

When recording, the stream recorder 102 creates the files necessary to store the stream portions (segments) on the resource server 106 in accordance with the configuration parameters maintained in the configuration database 104. Such configuration parameters are provided by a client application to the archive manager 100 through the archiver interface 101. The configuration parameters may include the maximum size in bytes per file or the maximum length (e.g. in minutes) that a file should contain. Each file represents a segment of a stream, each segment being stored on the resource server 106. The stream recorder 102 creates as many files as necessary on the resource server 106 to store the stream segments following the configuration parameters. The properties of each segment (stream properties) are transmitted to the archive manager 100 for storage in the stream database 105. In another embodiment, the stream recorder 102 may also write the stream properties directly in the stream database 105 so that the archive manager 100 may query them later when needed. The resource server 106 may be implemented using a file server, NAS, a storage location on cloud platforms, etc. that may provide enough space to record the streams.

As described herein, the stream database 105 stores information (stream properties) about segment files: file location (URL), file size, segment length, protection indicator, links with other streams. A database is used to allow the indexing of information to accelerate queries, however information can also be maintained in files. When a database is used, a database management system (e.g. MySQL, Microsoft SQL Server, Oracle, etc.) may be used to structure the information. Similarly, the configuration database 104 stores the configuration parameters of the archive manager 100: list of sources, recording schedules, streams to record, etc. The configuration parameters may be stored using a database management system (e.g. MySQL, Microsoft SQL Server, Oracle, etc.) and/or can also be maintained in files.

With the present standard archiver 110 described above, a person skilled in the art will understand that there are no obvious associations that exist between the streams stored in the resource server 106. The associations between the streams, for example between a video stream and its audio stream, are stored separately in the stream database 105, which is maintained by the archive manager 100. If the stream database 105 is lost, the associations between the streams stored in the resource server 106 may not be restored without manual intervention. However, this problem may be resolved with fusion streams.

Reference is made to FIG. 16, illustrating the exemplary fusion archiver 210 having the standard archiver 110 improved with the Fusion Engine 209 to support the creation and management of fusion streams. The fusion engine 209 is made of four components: fusion manager 200, fusion interface 201, fusion recorder 202, and fusion stream repository 206. Fusion manager 200 is the conductor of fusion engine 209 and fusion archiver 210. From the standard archiver 110 perspective, fusion engine 209 is a client application that communicates with archive manager 100 through the archiver interface 101, as would do other client applications. Fusion engine 209 provides an additional interface layer over the standard archiver 110 to provide fusion stream capabilities. By adding this layer, the fusion archiver 210 employs the robust capabilities provided by the standard archiver 110 to manage the archives (protection, retention, redundancy, disk management), even if the archives are generated automatically by the standard archiver 101 (recording on schedule, manual recording) or used as elementary streams being included in fusion streams.

Fusion manager 200 maintains in the fusion stream repository 206 a list of fusion streams, also called logical scenarios. For each fusion stream, the fusion stream repository 206 stores the fusion stream properties: unique identifier (GUID), composition parameters, and fusion nodes. Fusion stream repository 206 can implement a versioning system to keep track of all changes made to fusion streams and keep past versions of each one. Fusion stream repository 206 uses a versioning system similar to the Git model, however other versioning systems such as Apache Subversion and SVN can be used. When a versioning system is used, fusion stream repository 206 manages it. When the composition of a fusion stream changes (fusion nodes are added or deleted, composition parameters are modified, etc.), fusion stream repository 206 creates a new version of the fusion stream. Older versions are automatically kept by the versioning system. An older version of a fusion stream can be requested by passing the version number to fusion stream repository 206 so that is can retrieve the proper version from the versioning system. The fusion stream repository 206 may use a database management system (e.g. Microsoft SQL Server) to allow the indexing of information to accelerate queries, however the same information can also be maintained in files. Any database management system (e.g. MySQL, Microsoft SQL Server, Oracle, etc.) may be used to implement the fusion stream repository 206.

Each fusion stream is a sequence of fusion nodes. Each fusion node provides the elementary stream segments that are composing the logical scenario for the time period covered by the fusion node. In some embodiments, the segments of the elementary streams included in a fusion stream are not maintained by fusion manager 200. Instead, the fusion nodes reference them from the stream properties provided by the archive manager 100 or by a client application through fusion interface 201. The elementary streams (and more precisely their segments) are maintained by archive manager 100 and stored on resource server 106 within standard archiver 110. Contrary to archive manager 100 which can automatically start a recording, fusion manager 200 does not start recording fusion streams automatically. Instead, fusion manager 200 receives recording commands from client application through fusion interface 201. Client applications use fusion interface 201 to transmit commands to fusion manager 200 to obtain the list of fusion streams (or a subset according to query filters), create or delete fusion streams, protect or unprotect fusion streams, add or remove certificates used for stream encryption, add or remove elementary streams from fusion streams, and add new sequences to elementary streams. Fusion interface 201 also returns the status of each command to provide an indication that the command was successful or not, in which case an error message with cause of error is also return. Fusion interface 201 also returns fusion streams queried by client applications, references to elementary streams, elementary stream segments, and instance of fusion recorder 202.

When a client application creates a new fusion stream and adds a video elementary stream to it, the fusion engine 209 may work together with standard archiver 110. Fusion engine 209 is implemented as a Direct Link Library (DLL) file available to the client application. By linking to the DLL, the client application links to Fusion Engine 209 and gets access to Fusion Interface 201 defined in the DLL. Through Fusion Interface 201, the client application connects to the Fusion Archiver 210 from which the client application wants to access the Fusion Stream Repository 206. The client application uses the method below provided by fusion interface 201 by specifying in the archiverRole parameter the fusion archiver 210 to connect to:

```
public static IFusionStreamRepository Get(Guid owner, Guid
    archiverRole, IDatastoreProxy proxy)
```

A client application may use fusion engine 209 to connect to any fusion archiver 210 available on the network. The owner parameter allows for fusion stream grouping under a unique owner identifier. This means that multiple fusion stream repositories 206 can be stored on the same server. For example, fusion streams created under Owner_A will only be visible when retrieving the repository of Owner_A. Fusion streams that belong to other owners will not be returned. Once connected to the repository, the client application can obtain the list of fusion streams stored on fusion stream repositories 206. In this example, a new fusion stream is created in the repository using the following method provided by fusion interface 201:
IFusionStream CreateFusionStream(Guid id, string name);

Fusion manager 200 receives through fusion interface 201 the command to create a fusion stream and creates a new fusion stream in fusion stream repositories 206. The fusion stream does not contain any elementary stream yet, however one fusion node is added without any reference to elementary streams. Fusion manager 200 then returns a IFusionStream reference to the newly created fusion stream. With this reference to the fusion stream in hand, the client application may now add an elementary stream to its composition. This may be done by using the method below on the returned fusion stream reference:
IElementaryStream AddNewVideoElementaryStream(Guid id, string name);

For example, if the fusion stream reference is called fsRef in the code, the method may be invoked on fsRef as follows: fsRef.AddNewVideoElementaryStream(newGuid( ), "Video Elementary Stream").

Because fusion manager 200 does not manage elementary streams, fusion manager 200 relies on the archive manager 100. The elementary stream may already exist in the standard archiver 110 or it may be totally new (no data recorded so far). When an elementary stream is added, fusion manager 200 creates a new fusion node and stores it in the fusion stream repository 206. The fusion node contains an indication that an elementary stream composes the fusion stream. If the elementary stream already exists, fusion manager 200 sends through archiver interface 101 a request to archive manager 100 to get the stream properties of that elementary stream identified with a specific GUID. Since the user knows which elementary stream he wants to add to the fusion stream, the client application is able to provide the GUID to fusion manager 200 which in turn will provide the GUID to archive manager 100. More precisely, fusion manager 200 requests the properties of each segment that composes the elementary stream identified with the GUID. For each segment received from the archive manager 100, the fusion manager 200 creates a fusion node indicating the URL of the segment and the time period it covers. The URL provides the resource server 106 that stores the segment as well as the exact file on that server.

In this example, there is no data yet recorded for the elementary stream. Unlike the example of the standard archiver 110 acting alone, the fusion archiver 210 has the advantage of allowing a client application to push a sequence of data unexpectedly and asynchronously to fusion archiver 210 by opposition to the existing capability of standard archiver 110 to connect to a source (not a client application) and receive stream data directly from the source in a synchronous and continuous fashion. With fusion streams, it becomes possible to record an elementary stream after the fact; that is with data that already belongs to the past. The standard archiver 110 is made to record data in real time, as predictably received from a known source, and stores it as soon as it is received. With fusion stream, the standard archiver 110 has the capacity to record new elementary streams for past data, knowing that now the source is a client application that will transmit a finite sequence of data in an unpredictable and not continuous manner. Standard archiver 110 allows data to be pushed to it in bulk by the client application through fusion interface 201. The model is thus inverted for fusion streams compared to standard streams. Furthermore, the standard archiver 110 allows data insertion in existing elementary streams, which data belongs to the past. In order to support fusion streams, the standard archiver 110 is able to record new elementary streams with past data and insert past data within an existing elementary stream.

Furthermore, the archiver interface 101 of the fusion archiver 210 allows new commands to be sent to archive manager 100. The new commands indicate to archive manager 100 that data will be pushed from fusion recorder 202 directly to stream recorder 102. Instead of stream source receiver 103 being the source as with the standard archiver 110, fusion recorder 202 can become the effective stream source receiver on its own or alternatively in combination with the stream source receiver 103 as illustrated in FIG. 16. Also, because there is no need to connect to a source to receive the stream data within the archiver 110, stream source receiver 103 does not need to be instantiated. Stream recorder 102 may also allow having stream data pushed to it from fusion recorder 202. The new commands that can be transmitted to archive manager 100 and to stream recorder 102 allows this selection of fusion recorder 202 as being the source instead of stream source receiver 103.

In one example, the client application creates a new segment with past video data and adds it to the video elementary stream previously created. The following method of fusion interface 201 can be used to achieve this:

```
Task<ISequenceWriter> AddNewVideoSequence(IDateTimeRange range,
    VideoType compressionType, IElementaryStream elementaryStream);
```

The IElementaryStream object returned by method AddNewVideoElementaryStream above is passed to method AddNewVideoSequence to get an ISequenceWriter object with which the client application may write the data to the new segment. The ISequenceWriter object corresponds to fusion recorder 202 of FIG. 16. The application can then use this object and invoke the WriteAsync method below to push the frames of the video sequence to stream recorder 102.

```
public interface ISequenceWriter : IWriter
{
    Task<bool> WriteAsync(DateTime timestamp, byte[ ] data, bool
    isKeyFrame = true);
}
```

Fusion recorder 202 receives from the client application the data to be added to the elementary stream. Fusion recorder 202 then pushes the data to stream recorder 102 that was made ready to receive the data directly from fusion recorder 202 instead of to stream source receiver 103. The segments are still being managed by stream recorder 102, which creates as many segments as necessary to store the data according to the configuration parameters stored in configuration database 104. Stream recorder 102 also returns the stream properties (segment identifiers, locations, filenames, etc.) to fusion manager 200 via archive manager 100 and archiver interface 101. Fusion manager 200 then forwards the stream properties to fusion recorder 202 so that it creates the fusion nodes describing the composition of the fusion stream over time, referencing each new segment of the elementary stream as they are generated by stream recorder 102.

When adding an existing elementary stream to a fusion stream, fusion manager 200 creates and adds new fusion nodes to the fusion stream. In this situation fusion manager 200 queries the stream properties via archiver interface 101 and updates the fusion stream with new fusion nodes that indicate the location of each segment of the elementary stream as returned by archive manager 100. In situations where the client application pushes data pertaining to an elementary stream, the fusion nodes are created and added by the fusion recorder 202 according to the stream properties received from stream recorder 102 through archive manager 100 and archiver interface 101. In another embodiment, the stream properties can also be provided by the client application through fusion interface 201, in which case the stream properties can be passed with the command to add the elementary stream.

Rendering Fusion Streams

Using the programming interface, a fusion stream player can retrieve the stream information, in this example a video stream encoded with the H.264 format which is not encrypted. It can also retrieve the device identifier of the source of the stream. The same logic also applies to all elementary streams (segments) that are part of the fusion stream.

Figure 6:
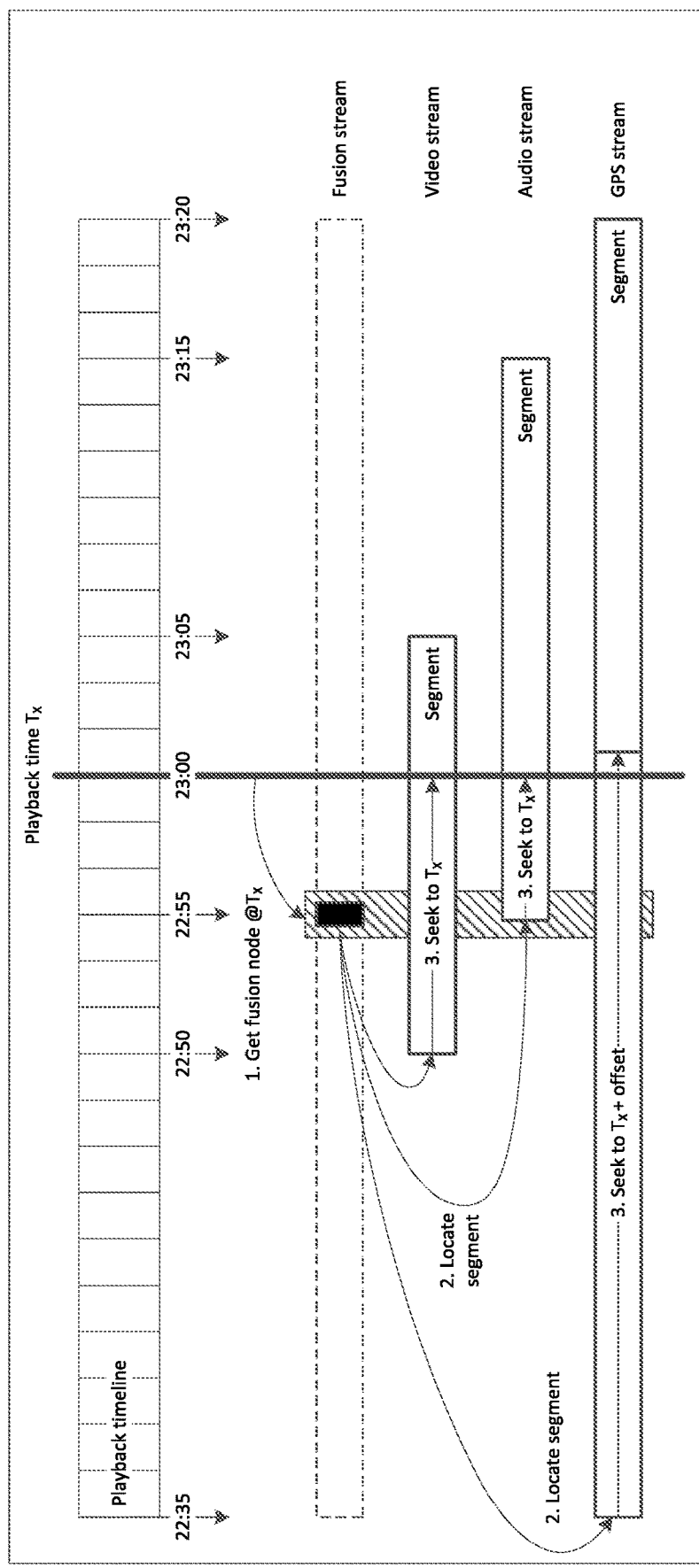
FIG. 6 is a schematic diagram of the selection of segment streams for scenario rendering.

If for example the user wants to replay the recording at 23:00, as illustrated in FIG. 6, the player will first read the definition of the fusion stream, will retrieve the fusion node corresponding to the requested time, will retrieve the segments to use with their location (file server, disk drive, NAS, etc.), and will combine them according to optional offset attributes.

Synchronization of the elementary streams is done by having all segments played at the same time TX. If for a specific segment there is no data available at time TX, depending on the type of segment being read, a seeking is made to look for the last available data (ex. encryption key) or there will simply no data rendered for this stream (ex. no audio or video data at time TX). This decision to seek for the last available data or not depends on the type of stream, for example video and audio streams vs key streams, and is part of the composition parameters. When an offset attribute is provided, the player application applies this offset at playback time when combining all the segments. Offsets are described later, but for now just assume there is none.

Figure 7:
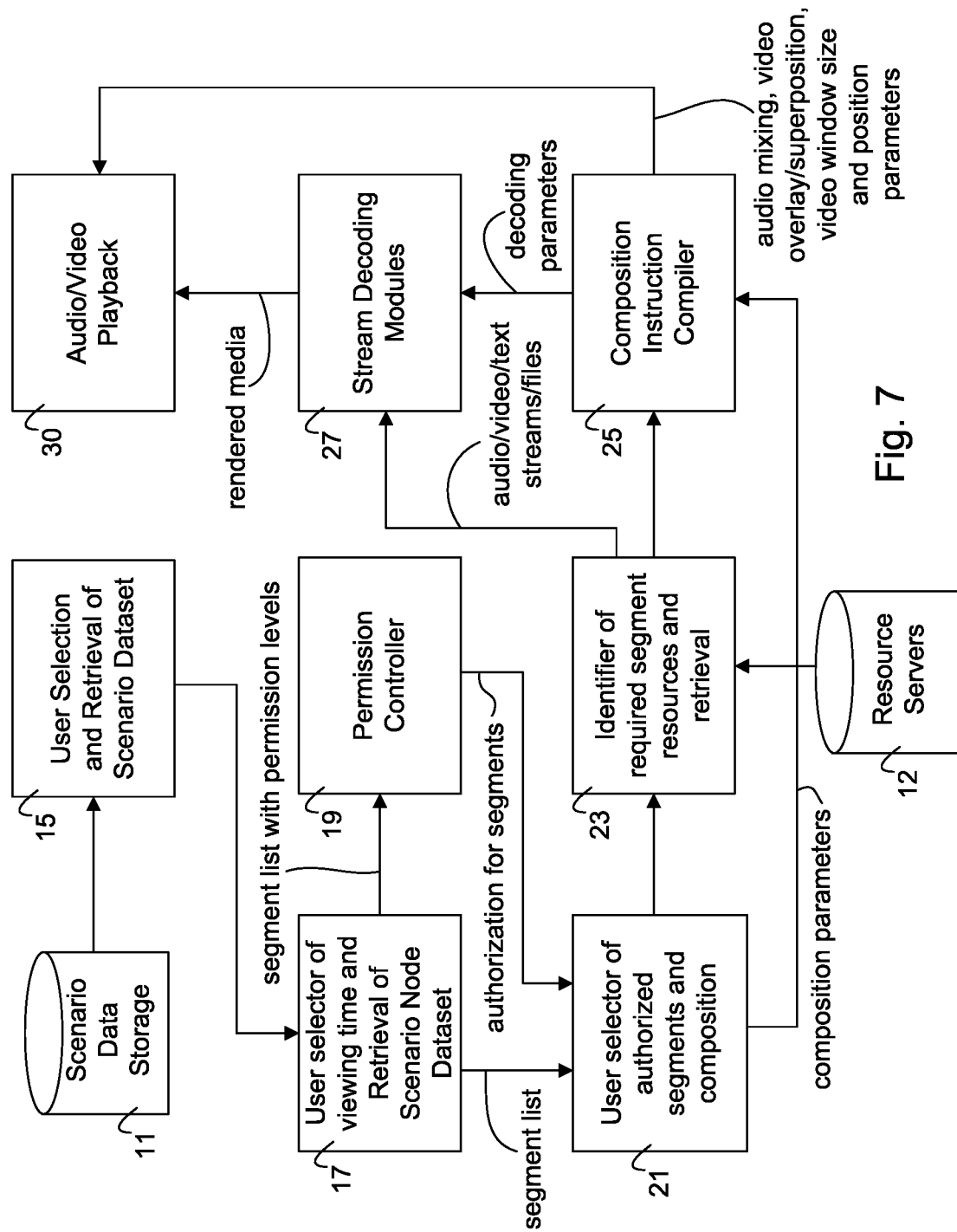
FIG. 7 is a schematic block diagram of software and hardware modules associated mainly with a playback apparatus.

The modules of the application program implemented to perform certain embodiments are illustrated in the block diagram of FIG. 7. The modules shown in FIG. 7 can be driven by software in the program memory 10c (shown in FIG. 2), however, as will be appreciated, interaction with the computer hardware for graphics rendering, audio generation and network communication can be involved.

Figure 8:
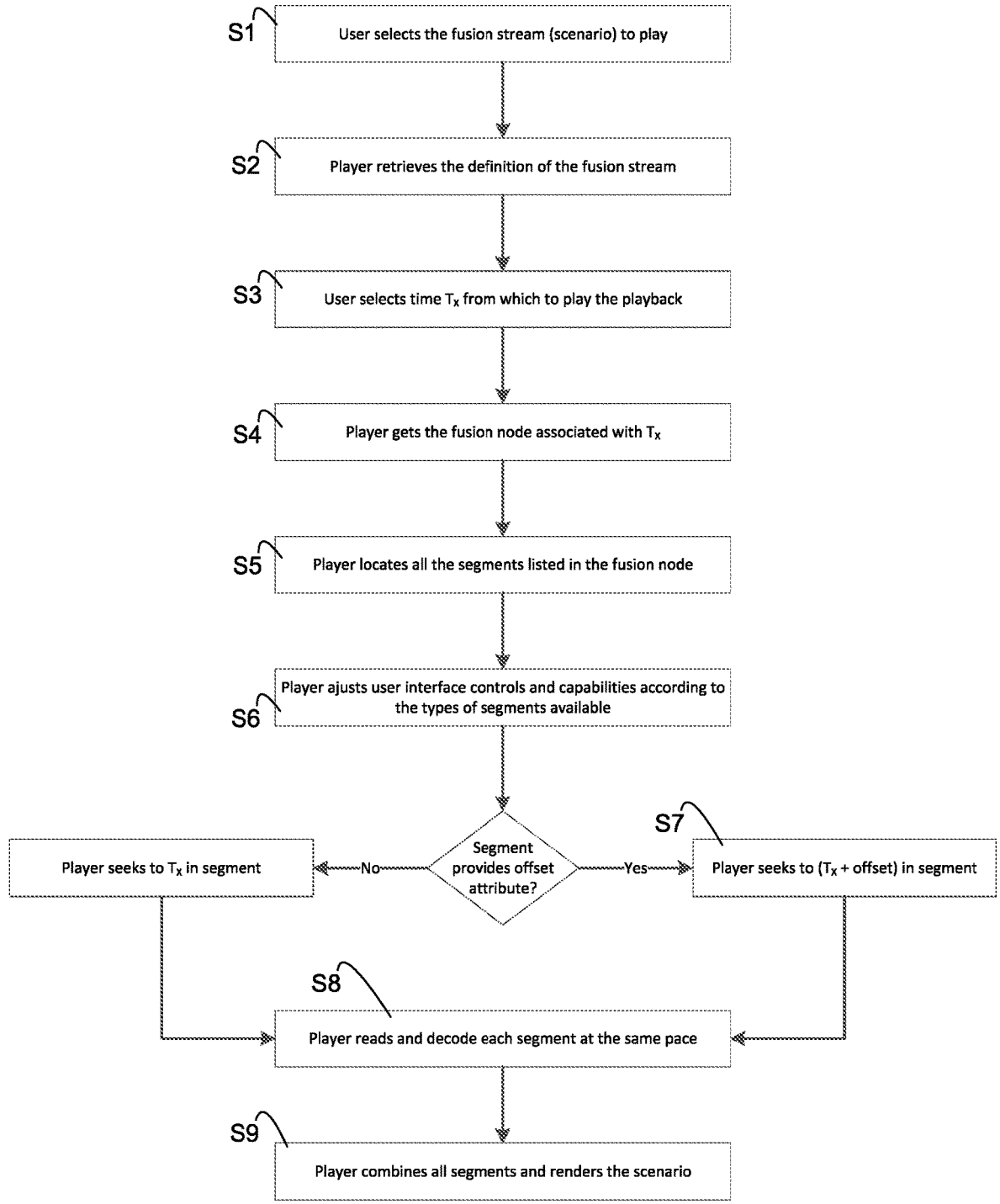
FIG. 8 is a flow chart of steps involved in playback of a fusion stream.

A module 15 provides a user interface to select and retrieve a scenario. In FIG. 8, this corresponds to steps S1 and S2. As described above, the user can specify a location and a time range, and module 15 searches the store 11 for fusion streams that match, retrieves them and present a list of fusion streams to the user. From this list, the user can select the specific fusion stream he is looking for. Module 17 provides a user interface to select the time (TX, step S3 in FIG. 8) from which to replay the scenario. Module 17 then extracts the segment list from the fusion node dataset corresponding to TX as can be understood from the above description and provides same to module 21 (steps S4 and S5 in FIG. 8). Module 17 also extracts the permission level or any other suitable permission control data and provides same to module 19. Module 19 determines whether the user is authorized to view each of the segments.

Module 19 can be as primitive as a few lines of code that compare the permission level with a set value for the computer 10 wherein the computer 10 is determined to have a fixed authorization level. Module 19 can involve interaction with an authentication server (not shown) that will interact with the computer 10 and/or the user to determine if the user is authorized. A chip card reader or iris scanner, for example, can be integrated into the workstation 10 for user authentication. A hardware-based security feature of the computer 10 can also be used when the computer 10 is associated uniquely with an individual or a specific level of authorization in an organization. Permissions can also be granted by linking the user's certificate to a segment, and more generally to a stream source. Additionally, if the segments are encrypted, module 19 can determine the segments for which the user has the proper private key. Once the permissions are determined, module 19 then provides the authorization information for the segments to module 21.

Module 21 provides a user interface to select one or more of available, permitted segments for viewing, along with any specific time markers (i.e. start time or optionally one or more time ranges) and composition details such as offsets, windows, text overlays in a video window (for example for building security badge reader data, GPS data overlay, license plate recognition overlays, user annotations or speech to text generated annotations), text displays, still image displays, relative volumes of sound tracks, etc. This is step S6 in FIG. 8. Module 21 also determines if there is an offset attribute and commands module 25 to apply an offset if required in step S7. Module 21 also makes the request to a download module 23 to retrieve the authorized and user selected segments (step S8 in FIG. 8). It will be appreciated that some segments can be required for other segments. An example is an encryption key stream for a stream of audio or video data. In this case, when a user asks to play an authorized stream, the corresponding decryption key stream will also be downloaded. The node data will set out this requirement for the decryption and the source of the decryption key stream required for decrypting the stream.

A first example of a video overlay that can be requested is text annotations that are similar to subtitles. The creation of such subtitling text files can be done using a user interface that includes a video stream player and allows the user to specify when a text annotation is to appear and then be removed from the overlay, along with the text annotation and optionally the position, size and color properties of the text. The annotation text file, which can also be seen as a data stream, can be formatted using a mark-up language to define the mentioned properties and can be attached to a fusion stream as another elementary stream. The annotation processing module 27 for handling text annotations then comprises a reader for the text annotation stream and generates a suitable overlay image stream to be blended with the video stream to which it is associated for providing at the correct times the appearance and removal of the annotation text as desired. The blending can be done within the decoding modules 27 or in the playback device 30. A speech-to-text application can then use fusion streams to associate and store the text stream with the video and audio streams to which it applies.

A second example of a video overlay that can be requested is image annotation. The creation of such image annotation data can be done using a user interface that includes a video stream player and allows the user to perform editing and annotation functions. Non-limiting examples of such functions are adjusting brightness and/or contrast of the image within and/or outside of a selected region of interest, drawing mark-up lines (such as circling an object or person of interest, drawing an arrow pointing to an object or person of interest) and selecting a region of interest for magnification and overlay within the image in a portion of the video that is not of interest. The image annotation file, which can also be seen as a data stream, can be formatted using a mark-up language to define the regions of interest and/or the definitions of the lines or shapes, and can be attached to the fusion stream as another elementary stream. The annotation processing module 27 for handling image annotations then comprises a reader for the image annotation stream and generates a suitable overlay image stream to be blended with the video stream to which it is associated for providing at the correct times the appearance and removal of the image annotation as desired. The blending can be done within the decoding modules 27 or in the playback device 30.

As already mentioned, the download module 23 identifies from the selected segment definitions found in the fusion nodes the location of the resources to be retrieved and manages the download requests to and buffering of the data received from the resource servers 12.

In the embodiment of FIG. 7, to facilitate implementation, module 21 provides composition parameters without specific configuration or knowledge about decoding and composition resources available in modules 27 and/or playback devices 30. It will be appreciated that such direct control is possible, however, as the introduction of a composition instructions compiler module 25 allows for the commands originating from the user interface 21 to be converted into software and/or hardware decoder and driver-specific and/or operating system-specific instructions. Module 25 is provided the types of the streams retrieved and determines which decoders 27 should be used to decode the downloaded streams or files (segments). The decoding parameters can be, for example, provided by software module call parameters sent by module 25. The audio mixing, video overlay/superposition, video window size and position parameters can be provided by calls to a rendering engine, device drivers and/or the operating system.

The composition instruction compiler 25, stream decoding modules 27 and playback devices 30 then collaborate to render and display or generate the audio and/or video streams (step S9 in FIG. 8) and/or any other elementary stream present in the composition of the scenario being played.

Adding New Content after the Fact

In this example, a user wants to add new content to an existing fusion stream. With current technology, it is usually very complex to add new content to an existing stream, whether is it a video stream, an audio stream or a metadata stream. Data streams contain immutable data that is not to be modified after it is recorded. Also, video and audio formats typically do not provide mechanisms flexible enough to add new types of metadata within their frames. Metadata can still be stored separately (for example, in separate databases) and combined by another module when rendered to the user, but related data can become easily scattered in multiple databases and servers. Fusion streams provide the capability to store any type of stream (video, audio, metadata, encryption keys, etc.) into a single entity. Because of this, it becomes easier to manipulate streams to add new content to them after they were recorded.

Consider for example the recording of the previous scenario, in which video, audio and GPS position streams were recorded from a city bus. Say that there was an incident last night in the bus between two passengers and it was found after the fact that someone made an audio/video recording with a smart phone. The investigators use the video surveillance system to add the new audio-video recording to the existing fusion stream, which represents the investigation case, so that the knowledge is improved. Using a fusion stream editor application (which can be separate or be part of the video surveillance system), namely a software module that is either the same as or similar to generator 13b of FIG. 1, the investigator selects the existing recording (fusion stream), clicks to add an evidence and selects the audio and video files. There can be a separate file for each type of stream. To do this the editor application would call the AddNewVideoElementaryStream and AddNewAudioElementaryStream methods from the programming interface shown in FIG. 14. When the files are added, module 13b updates the fusion stream to include the new video and audio segments (highlighted in bold below):

Fusion Stream

```
{
    "fusion-guid": "dce326c2-bd4c-4d53-98dd-2ec612ce2ce4",
    "fusion-composition-version": 2,
    "short-name": "Bus #1"
    "description": "Video, audio and position recordings pertaining to city bus #1"
    "creation-date": "2015-08-14 14:00"
    "created-by": "officer150"
    "read-permission-level": 0
    "write-permission-level": 0
    "tags": ["bus1", "video", "audio", "gps-position"]
    "fusion-nodes": ["991cfc40-88fc-4b6f-b34e-9c4b5e018baa"]
}
```

Fusion Node

```
{
    "fusion-node-guid": "991cfc40-88fc-4b6f-b34e-9c4b5e018baa",
    "streaming-time": ["2015-08-13 22:55"]
    "segments": [
    {
        "stream-guid": "5f102713-5a65-4f84-90d5-2ef212b0383c",
        "segment-guid": "e4c119dd-bae1-4edd-9729-1012143fddfc",
        "URI": "cloudarchiving.genetec.com/archives/2b42299c-771e-4b57-a671-663c3cb7962c/5f102713-5a65-4f84-90d5-
            2ef212b0383c/201508132250.h264",
        "SHA-1": "da39a3ee5e6b4b0d3255bfef95601890afd80709",
        "start-time": "2015-08-13 22:50",
        "end-time": "2015-08-13 23:05"
    },
    {
        "stream-guid": "7a663afb-0f06-41e4-9fad-9ad2dcf811fb",
        "segment-guid": "063ca43d-a8d1-4e7d-874d-7ecaecbd13cc",
        "URI": "cloudarchiving.genetec.com/archives/a5c6cb5e-1e3c-4a3a-862d-cfd47d4781a0/7a663afb-0f06-41e4-9fad-
            9ad2dcf811fb/201508132255.g711",
        "SHA-1": "4813223c33d7ca09493489b6e2f458c5e1f95806",
        "start-time": "2015-08-13 22:55",
        "end-time": "2015-08-13 23:15"
    },
    {
        "stream-guid": "9ea22729-fe14-48cc-8436-76e95770f683",
        "segment-guid": "f87dbbd8-3167-4b0c-b22d-82b2dcb38fc7",
        "URI": "cloudarchiving.genetec.com/archives/a5c6cb5e-1e3c-4a3a-862d-cfd47d4781a0/9ea22729-fe14-48cc-8436-
            76e95770f683/201508132235.gps",
        "SHA-1": "bdfbafd72af00e08dfb2609559b1e2c62a2492dc",
        "start-time": "2015-08-13 22:35",
        "end-time": "2015-08-13 23:20"
    },
    {
        "stream-guid": "991cfc40-88fc-4b6f-b34e-9c4b5e018baa",
        "segment-guid": "6854ada6-e95b-4e70-8b43-4d1108e2edbf",
        "URI": "cloudarchiving.genetec.com/archives/2bf0644f-a88e-4d48-abb3-0b9c049107ae/991cfc40-88fc-4b6f-
            b34e-
            9c4b5e018baa/201508132255.h264",
        "SHA-1": "ea53d50f3379a0e59d3597879fb6ced3a193ec19",
        "start-time": "2015-08-13 22:55",
        "end-time": "2015-08-13 23:10"
    },
```

```
{
    "stream-guid": "1129ca47-e189-42d5-ba56-43a20b3c3f0d",
    "segment-guid": "15903dcd-5967-4ee6-9d45-b5f6e58e2fa3",
    "URI": "cloudarchiving.genetec.com/archives/b41b7f8e-d9e8-441e-b8e1-2fb8170bb5c7/1129ca47-e189-42d5-ba56-
        43a20b3c3f0d/201508132255.g711",
    "SHA-1": "e1e565b98dd5672206c28dcb128895c3961b2a5c",
    "start-time": "2015-08-13 22:55",
    "end-time": "2015-08-13 23:10"
  }
]}
```

Take note of the following changes made to the initial version of the fusion stream:

fusion-composition-version: The version of the fusion stream is incremented to keep track of the changes made to the original stream, which has the same ID. This provides a built-in audit trail capability.

creation-date: Date and time when the new version of the fusion stream was created.

created-by: User who created the new version of the fusion stream.

fusion-node-guid: ID of the fusion node to look for in the new version of the fusion stream. Because fusion nodes are immutable, a new fusion node is created when new segments are added to a fusion stream.

segments: Two segments are added in the fusion node to link the new video and audio recordings made with a smart phone.

Figure 12:
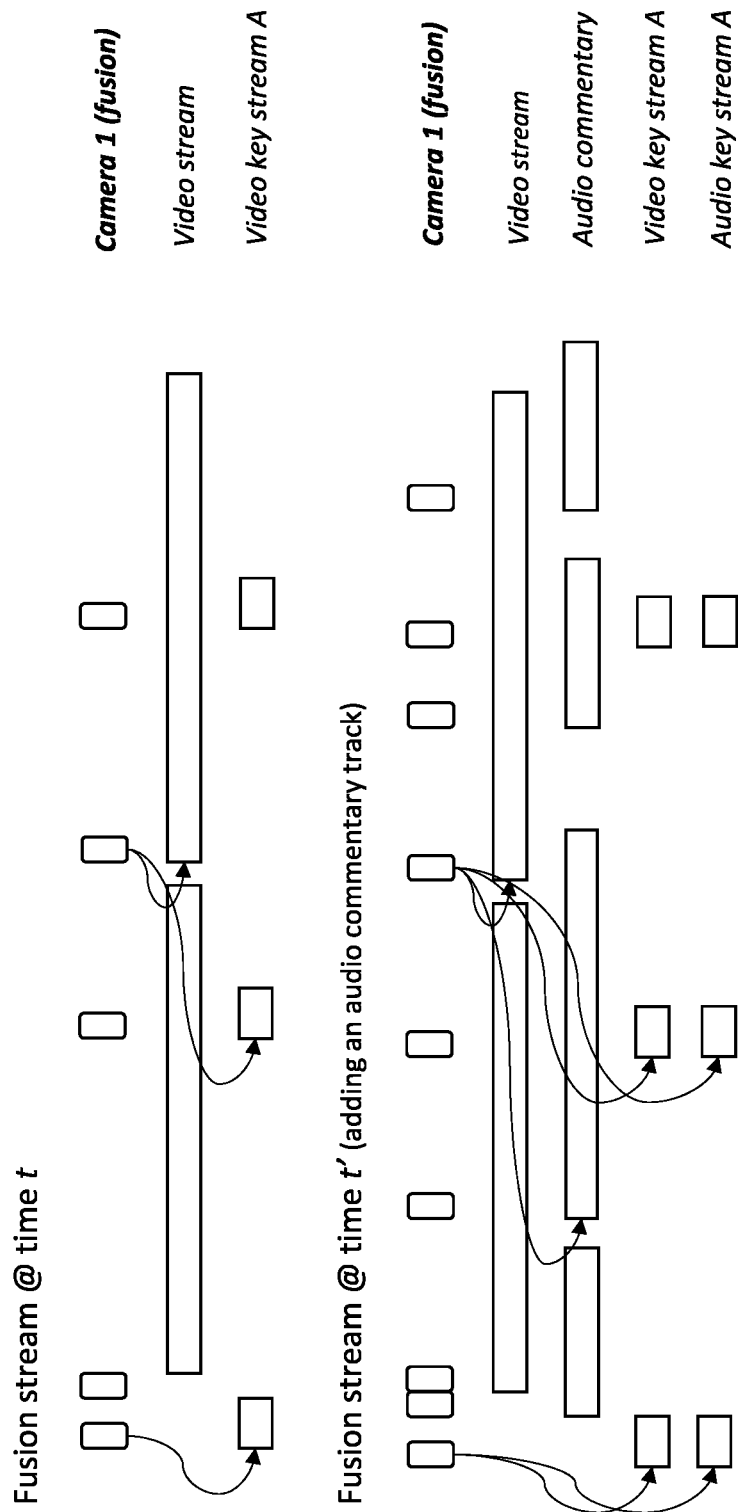
FIG. 12 is a schematic diagram showing an example of the aggregation of elementary streams by fusion streams.

In another embodiment, FIG. 12 shows how an audio commentary track can be added to the fusion stream and be easily associated with a corresponding video stream to improve the completeness of the scenario. Using the same mechanism of creating new fusion nodes and changing the version of the fusion stream, an audio commentary track and an associated audio key stream can be added to the fusion stream without having to modify the original video stream or the video key stream.

Adjusting the Synchronization

Using the player application system 10, the investigator selects the fusion stream to replay (step S1). The player retrieves the fusion stream information (step S2), loads all the segments and starts to play them synchronized at the beginning of the stream (T0). All streams are always synchronized by time so that all frames with timestamp TX are played at the same time. In this example the stream starts at time T0.

Figure 9:
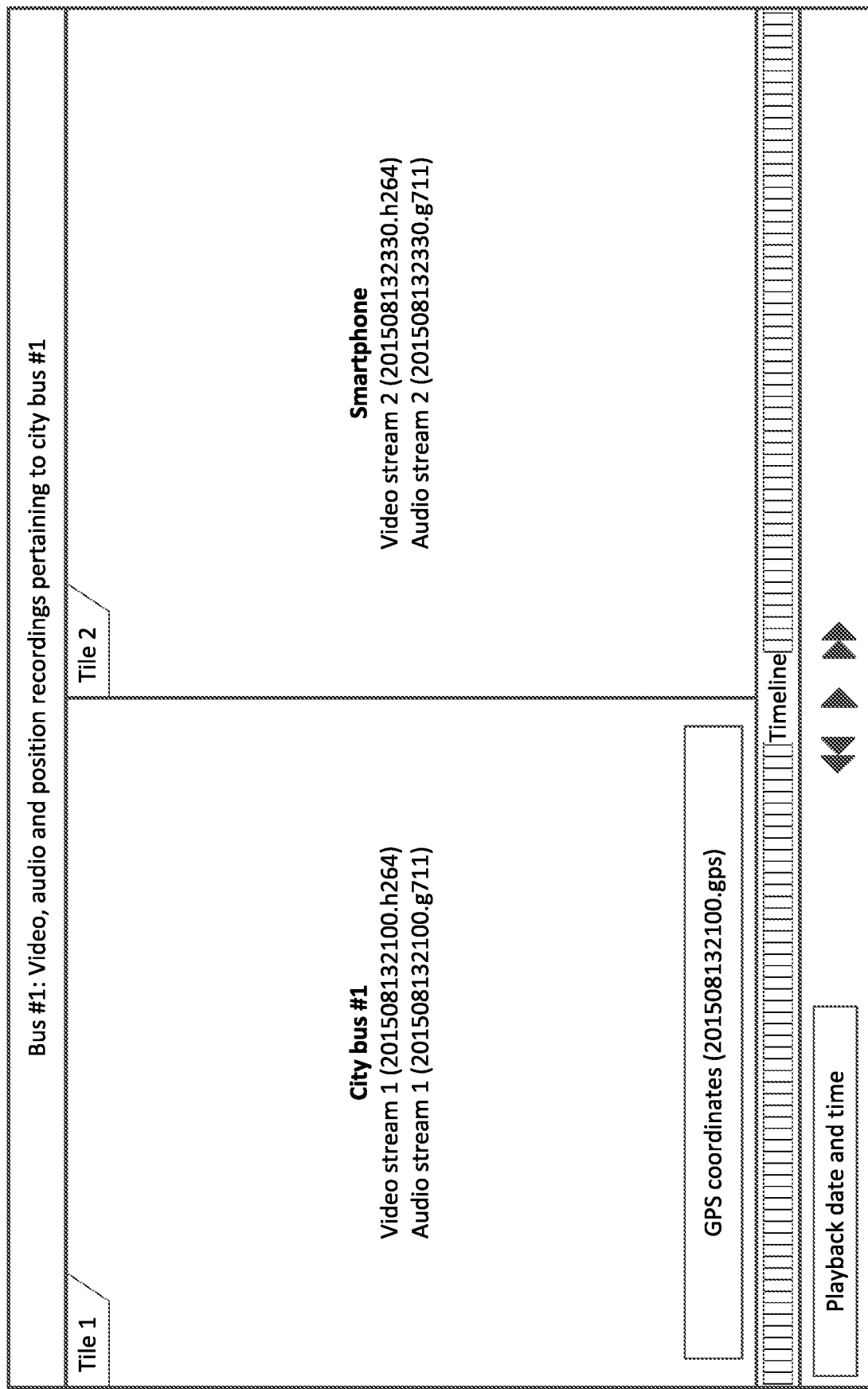
FIG. 9 is a schematic screenshot example of a player application interface showing two tiles.

During playback, the investigator observes that there is an offset between the streams played in Tile 1 and those played in Tile 2 of his display device that is part of component 30 and illustrated in FIG. 9. This can occur when the streams are not recorded by the same devices, which can have a clock difference between them.

Using a synchronization function provided, for example by module 21 or alternatively using module 30 where the offset can be edited and then saved in store 11 (step S7 in FIG. 8), the investigator can set an offset to the streams of Tile 2 to have them synchronized appropriately with the streams of Tile 1. When saving the fusion stream, it will look like this, where added information is highlighted in bold below:

Fusion Stream:

```
{
    "fusion-guid": "dce326c2-bd4c-4d53-98dd-2ec612ce2ce4",
    "fusion-composition-version": 3,
    "short-name": "Bus #1"
    "description": "Video, audio and position recordings pertaining to city bus #1"
    "creation-date": "2015-08-14 14:05"
    "created-by": "officer150"
    "read-permission-level": 0
    "write-permission-level": 0
    "tags": ["bus1", "video", "audio", "gps-position"]
    "fusion-nodes": ["6f641114-02f8-4a33-9ee5-133bcc2c80b1"]
}
```

Fusion Node:

```
{
    "fusion-node-guid": "6f641114-02f8-4a33-9ee5-133bcc2c80b1",
    "streaming-time": [2015-08-13 22:55]
    "segments": [
        {
            "stream-guid": "5f102713-5a65-4f84-90d5-2ef212b0383c",
            "segment-guid": "e4c119dd-bae1-4edd-9729-1012143fddfc",
            "URI": "cloudarchiving.genetec.com/archives/2b42299c-771e-4b57-a671-663c3cb7962c/5f102713-5a65-4f84-90d5-
                2ef212b0383c/201508132250.h264",
            "SHA-1": "da39a3ee5e6b4b0d3255bfef95601890afd80709",
            "start-time": "2015-08-13 22:50",
            "end-time": "2015-08-13 23:05"
        },
```

```
{
    "stream-guid": "7a663afb-0f06-41e4-9fad-9ad2dcf811fb",
    "segment-guid": "063ca43d-a8d1-4e7d-874d-7ecaecbd13cc",
    "URI": "cloudarchiving.genetec.com/archives/a5c6cb5e-1e3c-4a3a-862d-cfd47d4781a0/7a663afb-0f06-41e4-9fad-
        9ad2dcf811fb/201508132255.g711",
    "SHA-1": "4813223c33d7ca09493489b6e2f458c5e1f95806",
    "start-time": "2015-08-13 22:55",
    "end-time": "2015-08-13 23:15"
},
{
    "stream-guid": "9ea22729-fe14-48cc-8436-76e95770f683",
    "segment-guid": "f87dbbd8-3167-4b0c-b22d-82b2dcb38fc7",
    "URI": "cloudarchiving.genetec.com/archives/a5c6cb5e-1e3c-4a3a-862d-cfd47d4781a0/9ea22729-fe14-48cc-8436-
        76e95770f683/201508132235.gps",
    "SHA-1": "bdfbafd72af00e08dfb2609559b1e2c62a2492dc",
    "start-time": "2015-08-13 22:35",
    "end-time": "2015-08-13 23:20"
},
{
    "stream-guid": "991cfc40-88fc-4b6f-b34e-9c4b5e018baa",
    "segment-guid": "6854ada6-e95b-4e70-8b43-4d1108e2edbf",
    "URI": "cloudarchiving.genetec.com/archives/2bf0644f-a88e-4d48-abb3-0b9c049107ae/991cfc40-88fc-4b6f-b34e-
        9c4b5e018baa/201508132255.h264",
    "SHA-1": "ea53d50f3379a0e59d3597879fb6ced3a193ec19",
    "start-time": "2015-08-13 22:55",
    "end-time": "2015-08-13 23:10"
    "offset": 2000
},
{
    "stream-guid": "1129ca47-e189-42d5-ba56-43a20b3c3f0d",
    "segment-guid": "15903dcd-5967-4ee6-9d45-b5f6e58e2fa3",
    "URI": "cloudarchiving.genetec.com/archives/b41b7f8e-d9e8-441e-b8e1-2fb8170bb5c7/1129ca47-e189-42d5-ba56-
        43a20b3c3f0d/201508132255.g711",
    "SHA-1": "e1e565b98dd5672206c28dcb128895c3961b2a5c",
    "start-time": "2015-08-13 22:55",
    "end-time": "2015-08-13 23:10"
    "offset": 2000
    }
]}
```

The following changes are made to the previous version of the fusion stream:
- fusion-composition-version: The version of the fusion stream is incremented.
- creation-date: Date and time of creation of this new version of the fusion stream.
- fusion-node-guid: ID of the fusion node to look for in the new version of the fusion stream. Because fusion nodes are immutable, a new fusion node is created when new segments are added to a fusion stream.
- offset: Composition attribute added to the segments recorded with the smartphone in the current example. It can represent the delay in milliseconds required to have those streams synchronized with the streams recorded by the device installed in Bus #1. When reading this attribute, the player knows to add a delay.

Enabling Collaboration

Fusion streams become very useful when designing security systems that must provide collaboration and evidence management capabilities. Collaboration allows multiple individuals, departments and organizations to work together in a collaborative environment so that they can share existing content, but more important, to add new content to improve the knowledge pertaining to a scenario. The design of such systems will greatly be simplified with fusion streams.

For example, the investigators of the case described previously transmit the video streams to two separate departments. The first one will perform motion analysis and the second one will mask the images so that passengers (except the ones involved in the incident) cannot be recognized if the video is released to the public. Motion analysis is done with a video analytics system that analyzes the video stream provided in input and generates a separate stream of metadata containing the motion levels. Video masking is done manually by a user who replays the video stream, and in real time drags the mouse or a finger on a touchscreen to mask the face of each passenger who must remain unrecognized. Each mask generates a separate masking metadata stream.

Now consider that the two departments have completed their work and are now ready to add the resulting streams to the investigation case for which the identifier have been provided to them. Using a web browser, the user of each department logs on to the server on which the fusion streams are stored, selects the fusion stream corresponding to the investigation case and add the new streams to it. When all the streams are added to the fusion stream, the fusion stream will be updated as shown in the example below.

Fusion Stream:

```
{
    "fusion-guid": "dce326c2-bd4c-4d53-98dd-2ec612ce2ce4",
    "fusion-composition-version": 5,
    "short-name": "Bus #1"
    "description": "Video, audio and position recordings pertaining to
    city bus #1"
    "creation-date": "2015-08-15 10:25"
    "created-by": "tech2"
    "read-permission-level": 0
    "write-permission-level": 0
    "tags": ["bus1", "video", "audio", "gps-position", "motion",
    "masking"]
    "fusion-nodes": ["85f93061-1cfe-4f8b-a1ea-7ab7e2bd5060"]
}
```

```
{
    "fusion-node-guid": "85f93061-1cfe-4f8b-a1ea-7ab7e2bd5060",
    "streaming-time": ["2015-08-13 22:55"]
    "segments": [
        {
            "stream-guid": "5f102713-5a65-4f84-90d5-2ef212b0383c",
            "segment-guid": "e4c119dd-bae1-4edd-9729-1012143fddfc",
            "URI": "cloudarchiving.genetec.com/archives/2b42299c-771e-4b57-a671-663c3cb7962c/5f102713-5a65-4f84-90d5-
                2ef212b0383c/201508132250.h264",
            "SHA-1": "da39a3ee5e6b4b0d3255bfef95601890afd80709",
            "start-time": "2015-08-13 22:50",
            "end-time": "2015-08-13 23:05"
        },
        {
            "stream-guid": "7a663afb-0f06-41e4-9fad-9ad2dcf811fb",
            "segment-guid": "063ca43d-a8d1-4e7d-874d-7ecaecbd13cc",
            "URI": "cloudarchiving.genetec.com/archives/a5c6cb5e-1e3c-4a3a-862d-cfd47d4781a0/7a663afb-0f06-41e4-9fad-
                9ad2dcf811fb/201508132255.g711",
            "SHA-1": "4813223c33d7ca09493489b6e2f458c5e1f95806",
            "start-time": "2015-08-13 22:55",
            "end-time": "2015-08-13 23:15"
        },
        {
            "stream-guid": "9ea22729-fe14-48cc-8436-76e95770f683",
            "segment-guid": "f87dbbd8-3167-4b0c-b22d-82b2dcb38fc7",
            "URI": "cloudarchiving.genetec.com/archives/a5c6cb5e-1e3c-4a3a-862d-cfd47d4781a0/9ea22729-fe14-48cc-8436-
                76e95770f683/201508132235.gps",
            "SHA-1": "bdfbafd72af00e08dfb2609559b1e2c62a2492dc",
            "start-time": "2015-08-13 22:35",
            "end-time": "2015-08-13 23:20"
        },
        {
            "stream-guid": "991cfc40-88fc-4b6f-b34e-9c4b5e018baa",
            "segment-guid": "6854ada6-e95b-4e70-8b43-4d1108e2edbf",
            "URI": "cloudarchiving.genetec.com/archives/2bf0644f-a88e-4d48-abb3-0b9c049107ae/991cfc40-88fc-4b6f-b34e-
                9c4b5e018baa/201508132255.h264",
            "SHA-1": "ea53d50f3379a0e59d3597879fb6ced3a193ec19",
            "start-time": "2015-08-13 22:55",
            "end-time": "2015-08-13 23:10"
            "offset": 2000
        },
        {
            "stream-guid": "1129ca47-e189-42d5-ba56-43a20b3c3f0d",
            "segment-guid": "15903dcd-5967-4ee6-9d45-b5f6e58e2fa3",
            "URI": "cloudarchiving.genetec.com/archives/b41b7f8e-d9e8-441e-b8e1-2fb8170bb5c7/1129ca47-e189-42d5-ba56-
                43a20b3c3f0d/201508132255.g711",
            "SHA-1": "e1e565b98dd5672206c28dcb128895c3961b2a5c",
            "start-time": "2015-08-13 22:55",
            "end-time": "2015-08-13 23:10"
            "offset": 2000
        },
        {
            "stream-guid": "2c15907d-40b3-446d-81b1-71a81fb27711",
            "segment-guid": "91760391-6f3b-462f-ac1b-ca4e36c4d410",
            "URI": "cloudarchiving.genetec.com/archives/4cc8397d-44bb-4a93-9b45-a597a6e376cd/2c15907d-40b3-446d-
                81b1-
                71a81fb27711/201508132230.motion",
            "SHA-1": "9e92a838c4875f411b715979e299ad9e2bef0821",
            "start-time": "2015-08-13 22:30",
            "end-time": "2015-08-13 23:30"
        },
        {
            "stream-guid": "41abf4e7-b3fb-4b7d-a6ee-74ef8c08b49f",
            "segment-guid": "f5cac7cd-a64b-4b46-a6b0-5e378963c2d0",
            "URI": "cloudarchiving.genetec.com/archives/0bf2c54c-421d-471a-ae2d-a605761c6d20/41abf4e7-b3fb-4b7d-
                a6ee-
                74ef8c08b49f/201508132255.mask",
            "SHA-1": "7a13debf8a3636ab1b505e6d4c7d29a31e219df4",
            "start-time": "2015-08-13 22:00",
            "end-time": "2015-08-13 23:05"
        }
    ]}
```

The following changes are made to the previous version of the fusion stream:
- fusion-composition-version: The version of the fusion stream is incremented to 5 after the two departments have added their new content.
- creation-date: Date and time of creation of this new version of the fusion stream.
- fusion-node-guid: ID of the fusion node to look for in the new version of the fusion stream.
- segments: Two segments are added in the fusion node to link the new motion and masking streams. There could also be multiple masking streams if several passengers were to be hidden. But for illustration purposes, only one masking stream is added.

Figure 10:
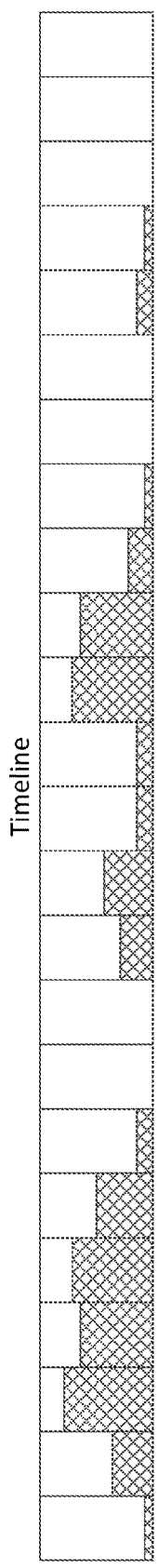
FIG. 10 is a timeline showing a ratio of motion detected in entire images.

When the scenario is selected for playback, the player retrieves the fusion stream and looks for its composition at the selected time. If the playback is started at the time the incident occurs (23:00), the player seeks to this time within the fusion stream and retrieves the fusion node that contains the 7 segments shown previously. The player then plays each stream simultaneously at the same time TX to render the complete scenario. As an example, motion levels can be shown on the timeline using vertical bars showing the ratio of motion detected in the entire images as shown in FIG. 10.

The player application 30 is the component responsible to combine and synchronize all the segments to be rendered to the user.

Segments can be removed from a fusion stream if needed. In this case the player application can use the RemoveElementaryStream method from the programming interface shown in FIG. 14. Because a versioning mechanism can be used to track all the changes made to fusion streams over time, it can be always possible to retrieve an older version. Versioning of fusion streams also provide configuration change reports (audit trails) that can be useful when audits are performed.

It should be noted that these embodiments do not define how each stream of metadata should be structured (ex. motion streams). It is assumed that the player knows how to decode each segment that uses a standard format (ex. H.264), as well as segments that are encoded using proprietary formats.

Protecting the Information

Whether the data is stored on local servers or in the cloud, it is desirable generally to be protected from unauthorized access. Data protection may become a mandatory requirement for most of the security systems installed today. When data protection is required, the data streams can be encrypted and can be referenced by fusion streams like any other stream.

Consider two types of streams:
Data streams: video, audio, metadata.
Key streams: encryption keys.

Figure 11:
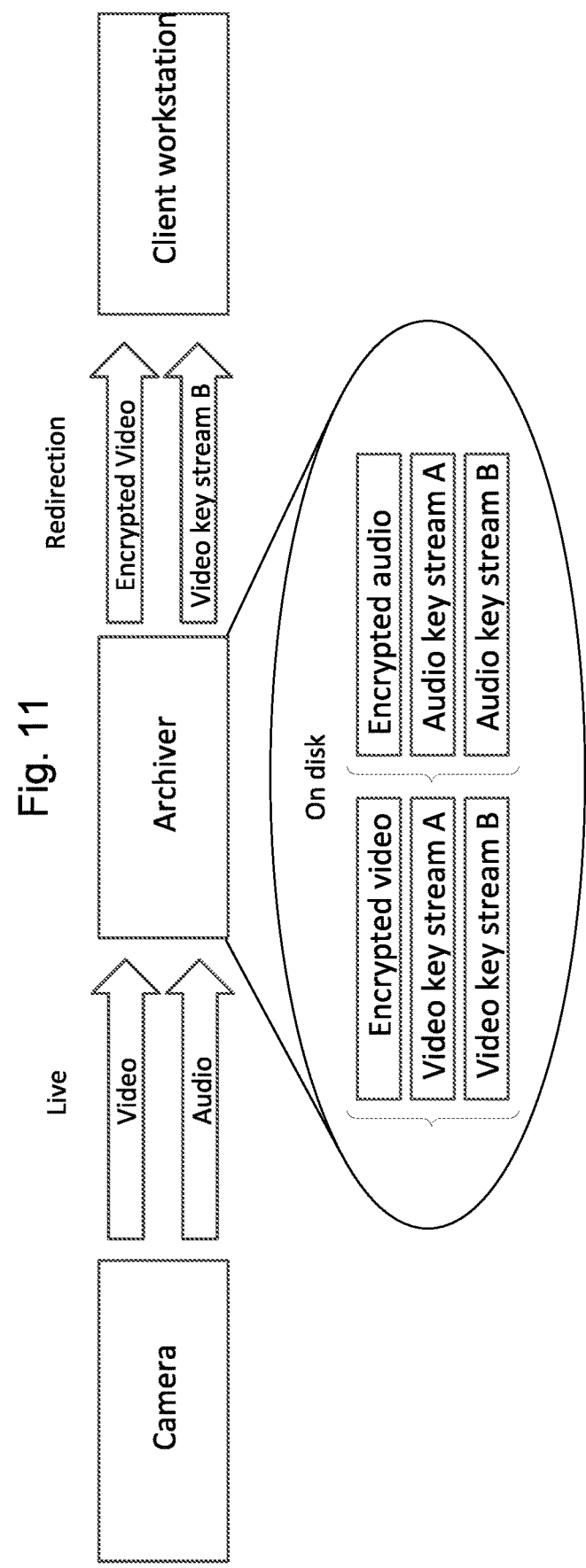
FIG. 11 is a schematic system diagram showing a camera source, archiver server and client workstation involving video encryption according to one embodiment.

When encryption is enabled, the system encrypts each data stream individually using a symmetric key that changes periodically, which corresponds to a master key stream. Symmetric encryption can be used because it is faster than asymmetric encryption and requires less processing resources. This represents a critical advantage when dealing with video and audio streams that can represent a very large amount of data. As shown in FIG. 11, for every data stream, the system generates one encrypted data stream (large amount of data) and one or more master key streams (small amount of data). The master key stream contains the symmetric keys used to encrypt the data streams.

While FIG. 11 shows that the archiver server receives unencrypted video and audio and redirects or feeds out encrypted video (and any audio, not shown) and the associated master key stream, it will be appreciated that encryption and the generation of the master key stream can be done at or in local association with the camera or other source device.

Using asymmetric encryption, the system then encrypts the master key stream using the certificate (public key) of each user who is granted access to it. Performing asymmetric encryption is more resource intensive than symmetric encryption, but because the master key stream represents a small amount of data, it becomes more acceptable. A separately encrypted client-specific key stream is generated for each combination of user certificate and data stream, as shown in this example.

Camera with one video stream and one audio stream.

Each stream is encrypted with two user certificates (A and B).

User with certificate B is watching live video (no audio).

It should be noted that key streams and data streams are part of the same streaming time dimension; that is, they belong to the same version of the fusion stream composition (same fusion-composition-version value) and the same streaming time TX applies. No decrypted data is persisted on disk (non-volatile memory). But once encrypted, a data stream never requires to be encrypted again when granting access to the data to new users or denying access to them. It is only needed to add or delete client-specific key streams (or part of client-specific key streams) to grant or deny access to the data.

Fusion streams can be used to compose a scenario that combines the encrypted data streams with the encrypted master key streams and client-specific key streams of all users who are granted access to the data. In other words, the fusion stream can represent the single point of access for both the encrypted data streams and encrypted key streams composing the logical scenario. The following shows how a fusion stream could look like after the system has recorded and encrypted the streams with two certificates (A and B).

Fusion Stream:

```
{
    "fusion-guid": "c04fd730-9ab1-482b-8eae-e0a80d268c7b",
    "fusion-composition-version": 1,
    "short-name": "Store entrance"
    "description": "Video and audio recordings pertaining to store's entrance"
    "creation-date": "2015-09-20 15:00"
    "created-by": "system"
    "read-permission-level": 100
    "write-permission-level": 100
    "tags": ["entrance", "video", "audio"]
    "fusion-nodes": ["0a316e81-5364-44cc-9693-104c997320d2"]
}
```

Fusion Node:

```
{
    "fusion-node-guid": "0a316e81-5364-44cc-9693-104c997320d2",
    "streaming-time": ["2015-09-20 15:00"]
    "segments": [
    {
        "stream-guid": "9232f989-58df-452a-a657-82e5f1e79a1f",
        "segment-guid": "fafc8316-6401-4113-86a7-ffcba6493f73",
        "URI": "cloudarchiving.genetec.com/archives/973e923c-c1ec-47cb-a183-0bde590ee55d/9232f989-58df-452a-a657-
            82e5f1e79a1f/201509201500.vek",
        "SHA-1": "cc39e01c6afbaf2d68547da2e26056acc25d495c",
        "start-time": "2015-09-20 15:00",
        "end-time": "2015-09-20 15:10"
    },
    {
        "stream-guid": "461f66b8-87ae-4a1a-86e7-41f3790f4c12",
        "segment-guid": "4e576de7-563b-4152-b8de-b14d8182b06b",
        "URI": "cloudarchiving.genetec.com/archives/6bfb1894-0fa9-486d-9c43-63642c434d07/461f66b8-87ae-4a1a-86e7-
            41f3790f4c12/201509201500.aek",
        "SHA-1": "c6091463fe1251ce7308e1b7bb3f47dff5cd2b9d",
        "start-time": "2015-09-20 15:00",
        "end-time": "2015-09-20 15:10"
    },
    {
        "stream-guid": "5324708a-3488-4e4f-a265-1f4406980749",
        "segment-guid": "23d095af-bd3c-45c6-8dcb-679122877889",
        "URI": "cloudarchiving.genetec.com/keys/ae4558f3-c2d0-4e3c-b6ed-cea561d56c82/5324708a-3488-4e4f-a265-
            1f4406980749/201509201500.kek",
        "SHA-1": "ebda8752a8f779590bf8c85d167b02bcf363969f",
        "start-time": "2015-09-20 15:00",
        "end-time": "2015-09-20 15:10"
    },
    {
        "stream-guid": "d1870b1b-8c70-4f6b-979d-46c7e8f69598",
        "segment-guid": "497968b4-5a16-4dc0-a7e3-5392ba8b09a3",
        "URI": "cloudarchiving.genetec.com/keys/afb43702-994a-45b7-85a7-b29de1273562/d1870b1b-8c70-4f6b-979d-
            46c7e8f69598/201509201500.kek",
        "SHA-1": "954b22092cc772675bdb6a6490a46ad7dd346051",
        "start-time": "2015-09-20 15:00",
        "end-time": "2015-09-20 15:10"
    },
    {
        "stream-guid": "c6a0aa1a-8c5d-403d-a490-b5dfcbfeb7d5",
        "segment-guid": "18cb0551-18ff-42ff-b7f3-61b98e8bce0d",
        "URI": "cloudarchiving.genetec.com/keys/2672ef25-c242-452f-9df2-921cc06581c4/c6a0aa1a-8c5d-403d-a490-b5dfcbfeb7d5/
            201509201500.kek",
        "SHA-1": "61d0924f7ea642c84b9439f71e3d38e5d0375e5f",
        "start-time": "2015-09-20 15:00",
        "end-time": "2015-09-20 15:10"
    },
    {
        "stream-guid": "8a02577c-b37e-42cb-9d9d-4f24b1bd2938",
        "segment-guid": "077d6013-62d3-4e30-b319-0438497a8d71",
        "URI": "cloudarchiving.genetec.com/keys/a48a335f-9021-4c38-b7ac-169e09456caa/8a02577c-b37e-42cb-9d9d-
            4f24b1bd2938/201509201500.kek",
        "SHA-1": "07065d2e9559f35d423b55982aa234c0cffd5b5c",
        "start-time": "2015-09-20 15:00",
        "end-time": "2015-09-20 15:10"
    }
]}
```

In one embodiment, the original video and audio streams have been encrypted in VEK and AEK files respectively, and 4 encrypted key segments stored in KEK files were added for certificates A and B. It should be noted that these file extensions are provided as examples and that other file extensions may be used to achieve the same functionality. The 6 segments provided in the fusion node are listed in the following order:

1. Encrypted video
2. Encrypted audio
3. Video key stream A
4. video key stream B
5. Audio key stream A
6. Audio key stream B The users' certificates are part of the system configuration. When streams are to be encrypted, the system can use those certificates to encrypt the key streams. An application can call the AddCertificate and RemoveCertificate methods of the programming interface to manage the certificates associated with a fusion stream.

For simplification of the example, all segments cover the same time period; that is, have the same time span (start-time and end-time values). However, it can be appreciated that each segment referenced by a fusion node can also have a different time span considering that each type of stream (video, audio, GPS, etc.) can have its own algorithm used to create the files. For example, video files can last for 10 minutes because the quantity of generated video data is more important, while audio files can last 20 minutes and metadata files can last 1 hour or more. They can also have the same length, however not being created at the same time, thus containing data for a different period of time.

To determine the type of stream being contained in an encrypted stream (segment), the player can invoke the GetStreamInfo(guid StreamID) method:

Example For a Video Steam

```
{
    "stream-guid": "9232f989-58df-452a-a657-82e5f1e79a1f",
    "encoder-guid": "5f30c838-e382-4ab9-9e60-00115a081abe",
    "origin-guid": "a5c6cb5e-1e3c-4a3a-862d-cfd47d4781a0",
    "media-type": "encrypted video (H.264)",
    "usage": "high resolution video"
}
```

Example for an Audio Stream

```
{
    "stream-guid": "461f66b8-87ae-4a1a-86e7-41f3790f4c12",
    "encoder-guid": "02026c5d-0fcc-4bdf-85b9-103d56b32676",
    "origin-guid": "a5c6cb5e-1e3c-4a3a-862d-cfd47d4781a0",
    "media-type": "encrypted audio (G.711)",
    "usage": "audio"
}
```

Example For a Key Steam

```
{
    "stream-guid": "5324708a-3488-4e4f-a265-1f4406980749",
    "media-type": "encrypted symmetric keys",
    "certificate": "A"
}
```

In this example, User A with certificate A and User B with certificate B can both access the video and audio streams recorded by the system. However other scenarios may exist in which users must be added or removed from the list of authorized users for specific types of streams. If for example user B is denied access to the audio stream, the segment audio key stream B is removed from the fusion stream using the RemoveElementaryStream method from the programming interface. For additional security purposes, the key stream can also be deleted from the file system using the same method.

Segment Removed from the Fusion Stream

```
{
    //audio key stream B
    "stream-guid": "8a02577c-b37e-42cb-9d9d-4f24b1bd2938",
    "segment-guid": "077d6013-62d3-4e30-b319-0438497a8d71",
    "URI": "cloudarchiving.genetec.com/keys/a48a335f-9021-4c38-b7ac-169e09456caa/8a02577c-b37e-42cb-9d9d-
        4f24b1bd2938/201509201500.gek",
    "SHA-1": "07065d2e9559f35d423b55982aa234c0cffd5b5c",
    "start-time": "2015-09-20 15:00",
    "end-time": "2015-09-20 15:10"
}
```

Because fusion streams provide the capability to implement a two-layer encryption mechanism; that is, the first layer being the symmetric encryption of the data stream with a sequence of symmetric keys, and the second layer being the asymmetric encryption of the sequence of symmetric keys with the users' certificates, it becomes a lot easier to grant and deny access to the data or parts of it. In such cases, it is not required to decrypt and re-encrypt the data streams. When a user is to be granted access to the data, the system can decrypt the key stream and encrypt it with the certificate of the new user, hence creating a new client-specific key stream. Decrypting the key stream is performed with the private key of the authorized user who wants to add the new user. When a user is to be denied access, the corresponding key stream (or only a portion of it) will be removed from the fusion stream and can also be deleted from the file system.

It is also possible to control access rights at the segment level. By deciding which segments to encrypt with a user's certificate, it is possible to control which specific segments the user can view. If a new user requires access to a segment, it is not required to decrypt and re-encrypt the segment with the new user's certificate. Instead, it is only required to generate a new client-specific key stream for that certificate and add it as an elementary stream to the corresponding fusion stream.

For example, in some jurisdictions, it is illegal to record video from a public area but it is legal for the police to access and use in court recordings made illegally. Although this may not be illegal in other countries, it can still represent a privacy concern. If the owner of a convenience store in such a jurisdiction wants to protect his assets from vandalism and robbery, he cannot install a camera and record the video. However, using the two-layer encryption mechanism allowed by fusion streams, it could be possible for the owner to record encrypted video and audio streams that only the police could access, thus providing means for the owner to protect his business.

Figure 13:
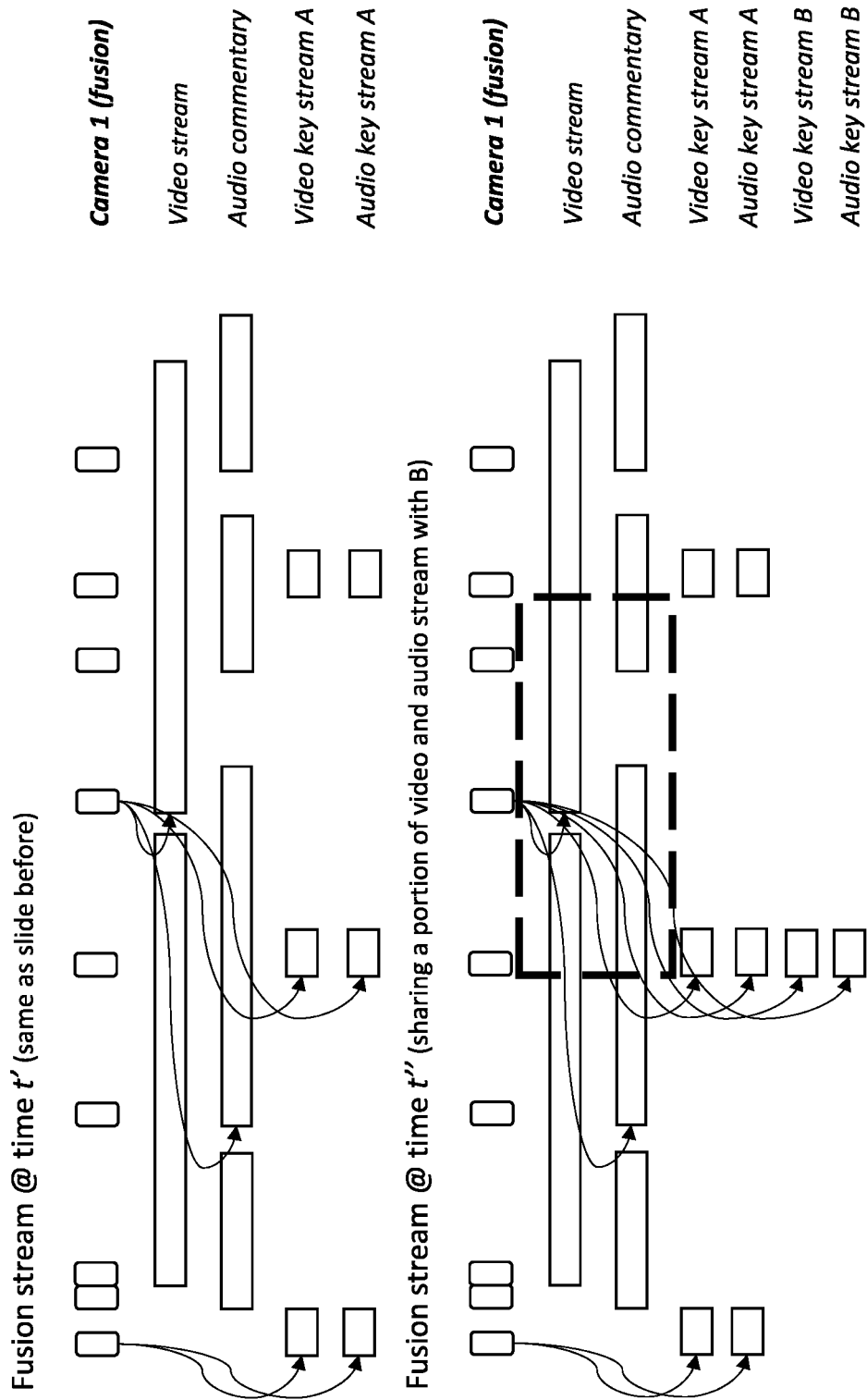
FIG. 13 is a schematic diagram showing an example of permission granting allowed by fusion streams.

FIG. 13 shows that it is also possible to grant access only to portions of segments from elementary streams that compose a fusion stream. In this example, the video stream and the audio commentary stream are entirely accessible by user A. However, user B has access only to the portion shown in the box with dotted line. This is because Video key stream B and Audio key stream B include only the keys necessary to decrypt this portion of data. When the key with which the data is encrypted changes, it is not provided to user B who is denied access to view the content outside the bounding box.

Fusion Stream Player

When fusions streams have been generated by fusion archiver 210 and are available in Fusion Stream Repository 206, they can be retrieved from the repository to be replayed. This is where a fusion stream player comes into play. The application that creates fusion streams is not necessarily the same one that plays them afterwards. However, a single application can be developed to perform both the tasks of generating fusion streams and playing them.

Referring to FIG. 7, the user selection and retrieval of scenario dataset module 15 provides a user interface to query the fusion streams stored in scenario data storage 11, which corresponds to fusion stream repository 206 of FIG. 16. The user selection and retrieval of scenario dataset module 15 can provide filters to restrict the number of results returned. Filters can be provided to search for fusion streams that cover a certain time range, have a specific scenario name, contain certain words in their name or description, are stored at a specific location, are composed of specific elementary streams, have certain attributes, etc. The user selection and retrieval of scenario dataset module 15 uses fusion interface 201 provided by the DLL file of fusion engine 209 to connect to fusion archiver 210 using the following method, where archiverRole is the fusion archiver 210 that manages the repository to access:

```
public static IFusionStreamRepository Get(Guid owner, Guid
    archiverRole, IDatastoreProxy proxy)
``` public static IFusionStreamRepository Get(Guid owner, Guid archiverRole, IDatastoreProxy proxy)

When multiple fusion archivers 210 exist on the network, the fusion stream player application can provide a user interface to select the fusion archiver 210 to reach. Once connected, the user selection and retrieval of scenario dataset module 15 retrieves the list of fusion streams available from scenario data storage 11 owned by the owner GUID as this was described before. The user selection and retrieval of scenario dataset module 15 retrieves the fusion streams using the following method provided by fusion interface 201:
IReadOnlyCollection<IFusionStream>FusionStreams {get;}

As a result, fusion manager 200 returns a collection of IFusionStream objects. Each object contains the fusion stream properties, such as its unique identifier (GUID), name, configuration settings, retention period, redundant archiving indicator, and the collection of elementary streams that compose the fusion stream. If scenario data storage 11 implements a versioning system to keep track of past versions of a fusion stream, these multiple past versions may be returned as well with a distinct GUID and a version property. The user selection and retrieval of scenario dataset module 15 can display a list of fusion streams (latest and older versions in the same list) with their properties, from which the user can select the one he is interested in. A user interface can also provide filters based on these properties to reduce the number of results displayed if needed. The user selection and retrieval of scenario dataset module 15 then transmits the GUID of the selected fusion stream to the user selector of viewing time and retrieval of scenario node dataset module 17, where a user interface allows the selection of a time TX from which to replay the scenario. The selector and retrieval module 17 also provides the playback controls to start, stop, fast forward, rewind, or seek into the scenario. The selector and retrieval module 17 extracts from the fusion stream the fusion node that applies for TX. The fusion node provides the exact segments of the elementary streams that compose the fusion stream that apply to TX. The fusion node can also provide offset values, an access level needed to read the segments, text labels with their position and size properties, etc. The selector and retrieval module 17 sends a request command to fusion manager 200 to obtain all the segments applicable to TX using the following method provided by fusion interface 201:

```
Task<IEnumerable<ISequence>> QuerySequencesAsync(IDateTimeRange
boundaries,
    IEnumerable<Guid> elementaryStreamFilter = null);
```

This method returns the list of segments for the specified time range and filtered by elementary streams or all elementary streams if no filter is specified. The selector and retrieval module 17 can also extract the segments associated with a coming time range of the playback so that the permissions can be checked and the segments can be retrieved in advance from the Resource Servers 12 to avoid lags in the playback. The list of segments retrieved from the fusion node with the QuerySequencesAsync method is transmitted to the permission controller 19. The selector and retrieval module 17 also transmits the same list to the user selector of authorized segments and composition module 21.

Permission controller module 19 performs several checks to determine if a user has the permission to view the content provided by a segment of an elementary stream. A first check made by permission controller module 19 is to compare the minimum access level specified for the segment with the user access level configured in the security monitoring system. For example, a user or a group of users can be configured with a user level of 100. If the user level or user group level matches or exceeds the minimum access level specified for a segment (i.e. 80), then the user is able to view the content of the segment. Otherwise it is denied access to the entire segment. A second check performed by permission controller module 19 is to verify if the user has the privileges to view the segment. Several user privileges can be configured to allow or deny a user to view video content, listen to audio content, create, edit or delete video and audio recordings, export video, block or unblock video, protect or unprotect video recordings, etc. With this second check, permission controller module 19 verifies for example that the user has the privileges to view video content and to listen to audio content. Access to a type of content is only granted if the user's privileges configured in the system by an administrator allow such access. The privileges are not stored in fusion streams but in system configuration instead. However, because module 19 knows which type of information a segment contains, it is able to compare it with the corresponding user privilege. A third check performed by module 19 is to verify for an encrypted segment if the user can decrypt the segment—to avoid, for instance, the inefficient situation where the encrypted segment is obtained from a remote storage server and where it is realized at the rendering time that the user does not have the private key to decrypt the segment. Permission controller module 19 compares the user's certificate with the collection of certificates associated with the fusion stream. Using the following method, permission controller module 19 can request from fusion manager 200 through fusion interface 201 the collection of certificates pertaining to the fusion stream to which the segment belongs:
IReadOnlyCollection<X509Certificate2>Certificates {get;}

Permission controller module 19 creates a thumbprint of each certificate (user's certificate and certificates associated with the fusion stream) using a SHA-1 hash function. Permission controller module 19 then compares the certificate thumbprint of the user requesting to view the segment with the thumbprint of each certificate returned by Fusion Manager 200. When it is confirmed that the segment was encrypted with the user's certificate (public key), meaning that the user has the corresponding private key to decrypt the segment, module 19 provides permission to access the segment. If permission controller module 19 cannot find a match, it denies access without having to perform any useless decrypting operation. Fusion streams are implemented using the ITU-T X.509 standard to manage user certificates. In cryptography, X.509 is an important standard that is widely accepted internationally for a Public Key Infrastructure (PKI) used to manage digital certificates and public-key encryption. The X.509 standard is a key part of the Transport Layer Security (TLS) protocol used to secure the communications between two computers. The X.509 standard specifies formats for public key certificates, certificate revocation lists, attribute certificates, and a certification path validation algorithm. More precisely, a X.509 certificate is a digital certificate that uses the X.509 PKI standard to verify that a public key effectively belongs to the user, a computer or a service identity contained within the certificate. A skilled person will readily recognize that other standards and certificates may be used without departing from the present teachings.

Once permission controller module 19 has completed these checks, the segments for which the user is denied access are known in advance and will not be retrieved uselessly from resource server 12. Permission controller module 19 then transmits to the user selector of authorized segments and composition module 21 an authorization token for each segment originally provided by the selector and retrieval module 17. The token associate the segment GUID with the authorization decision, which is a Boolean "denied" or "granted".

The user selector of authorized segments and composition module 21 provides a user interface that shows the segments of the fusion stream that the user is authorized to view as indicated by the authorization tokens received from permission controller module 19. As shown in FIG. 9, a timeline is generated and displayed to show the time periods for which content of at least one segment is available within the scenario. The timeline shows authorized content for any given time. It also shows gaps for which no data is available. The user selector of authorized segments and composition module 21 can also provide means to select specific authorized segments to read in the scenario playback. However, in the preferred embodiment this selection is not offered by the fusion stream player, where the user selector of authorized segments and composition module 21 replays all the segments that the user is authorized to view. However, in a fusion stream editor application offering additional features, this capability can be provided to the user. The user selector of authorized segments and composition module 21 then transmits to identifier of required segment resources and retrieval module 23 the list of segments to retrieve from resource server 12. Because the segments can be distributed among many resource servers 12, the identifier of required segment resources and retrieval module 23 uses the segment properties to locate the resource server 12 that stores a segment as well as the file to request from resource server 12. Archive files do not need to be received completely from resource server 12 before making the first data available to the composition instruction compiler module 25 and the stream decoding modules 27. Because the Real-time Transport Protocol (RTP) transport protocol is used to transmit the stream data, a few RTP packets can be enough for the composition instruction compiler module 25 and the stream decoding modules 27 to start performing their work, as it is described herein.

An important task performed by the user selector of authorized segments and composition module 21 is to generate the composition parameters used by composition instruction compiler 25. Because composition instruction compiler module 25 works with each segment independently without having any knowledge about the relationships between them, the user selector of authorized segments and composition module 21 is the conductor of the scenario who provides the composition parameters to indicate such relationships to the composition instruction compiler module 25. The composition parameters include encryption keys, masking overlays, text overlays, time offsets, display layers, windowing, etc. that can be interpreted from the fusion nodes so that the scenario is rendered properly. Therefore, the user selector of authorized segments and composition module 21 is the fusion node interpreter that generates the composition parameters (commands) required to conduct the scenario. For example, in some embodiments, segments will frequently be encrypted to protect them from unauthorized access. This requirement becomes always more important over time with each new installation being deployed. When a video segment VSeg_1 encoded with the H.264 format and an audio segment ASeg_1 encoded with the G.711 format are encrypted with the certificate (public key) of a user (UCer_1), the fusion node automatically provides an asymmetrically encrypted user-specific key segment (VUKey_1) necessary to decrypt the symmetrically encrypted video segment. The fusion node also provides a second asymmetrically encrypted user-specific key segment (AUKey_1) necessary to decrypt the symmetrically encrypted audio segment. With this information, the user selector of authorized segments and composition module 21 generates the following composition parameters transmitted to module 25, where VSeg_1, VUKey_1, ASeg_1, AUKey_1, and UCer_1 are references to the segments and the user certificate:

Decrypt (VSeg_1, VUKey_1, UCer_1)
Decode (VSeg_1, H264)
Decrypt (ASeg_1, AUKey_1, UCer_1)
Decode (ASeg_1, G711)
Fuse (VSeg_1, ASeg_1)

As it can be observed with this example, composition parameters are commands sent to the composition instruction compiler module 25 to establish relationships between the segments so that the composition instruction compiler module 25 knows how to combine them to obtain the desired results. In another example, an encrypted segment providing masking data (MSeg_1) associated with a specific video segment VSeg_1 is provided to the composition instruction compiler module 25 as the following composition parameters, where VSeg_1, MSeg_1, MUKey_1, and UCer_1 are references to the segments and the user certificate:

Decrypt (MSeg_1, MUKey_1, UCer_1)
Decode (MSeg_1, MASK)
Fuse (VSeg_1, MSeg_1)

The composition instruction compiler module 25 provides an interface that is used by the user selector of authorized segments and composition module 21 to pass the composition parameters under the form of commands:
Decrypt (srcSegment, keySegment, userCertificate)
    Decrypt the key segment with the private key corresponding to the user certificate, then decrypt the source segment with the decrypted key segment.
Decode (srcSegment, segmentType)
    Decode the source segment using the specified decoding module.
    segmentType indicates the decoding module to use: H264, MPEG4, MJPEG, HEVC, etc. for video segments.

AAC, G711, G723, GSM0610, MPGA, etc. for audio segments.

MASK, TEXT, POLYGONS, etc. for overlay segments.

Offset (srcSegment, delay)

Apply an offset of X milliseconds to the source segment prior to rendering.

Fuse (srcSegment, addedSegment)

Fuse (synchronize) the rendering of the added segment with the source segment.

Figure 17:
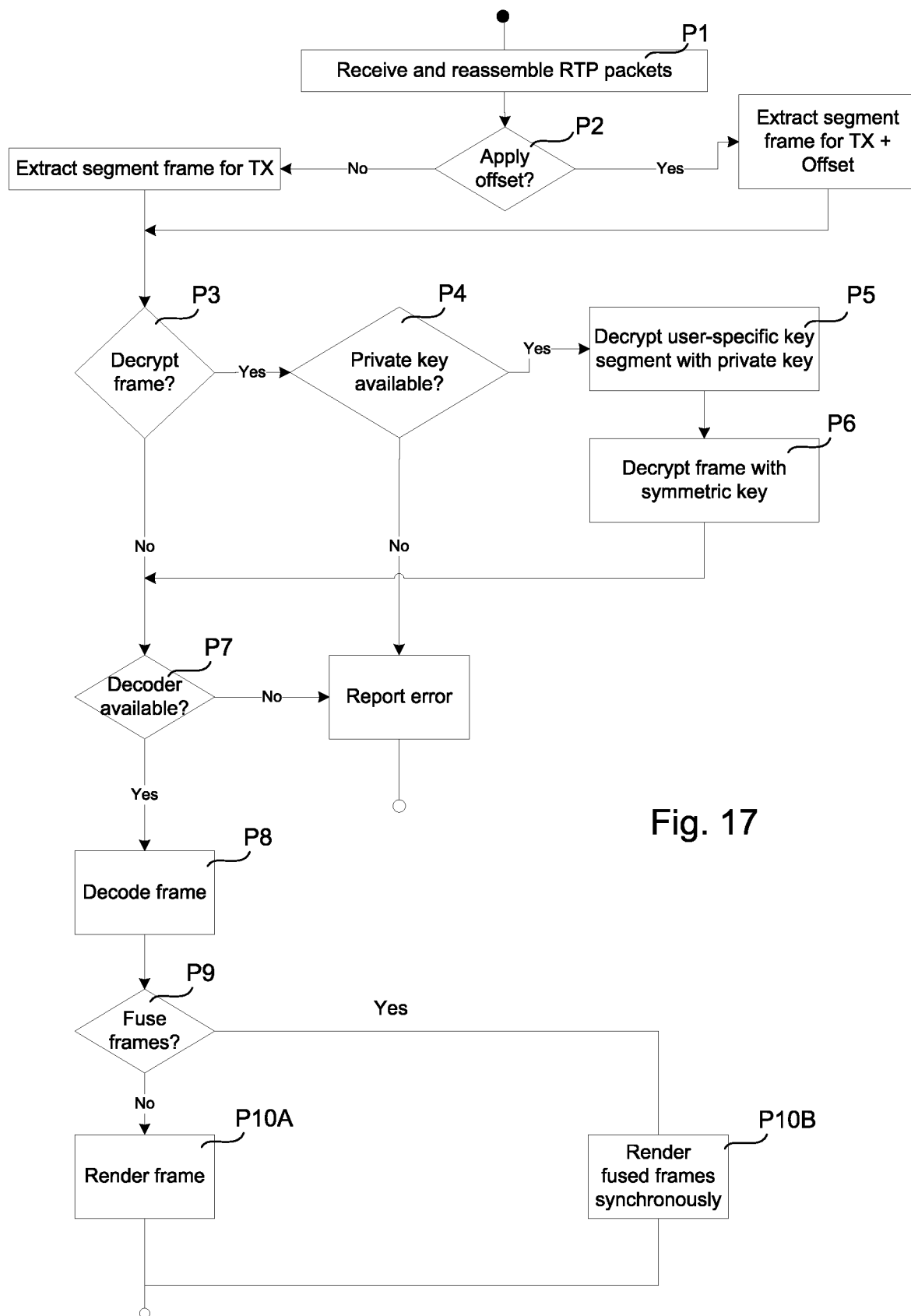
FIG. 17 is a flow chart diagram illustrating an exemplary set of steps involved in the reading and the rendering of a stream segment.

Composition parameters can be easily adapted to support future capabilities by adding new commands to the interface. The composition parameter commands can be sent to composition instruction compiler module 25 notwithstanding the availability of the decoding module required to perform the task. FIG. 17 shows the workflow between composition instruction compiler 25, stream decoding modules 27 and audio/video playback 30.

FIG. 17 is an exemplary flowchart of a stream pipeline for reading and rendering segments in video streams, audio streams and any other data stream, using composition instruction compiler 25, stream decoding modules 27 and audio/video playback 30. In one example, composition instruction compiler module 25, resource server module 27 and audio/video playback module 30 use standard decoders and frameworks available for the Microsoft Windows operating system.

The exemplary stream pipeline of FIG. 17 is that of a video stream, however it will be understood that a stream pipeline, like the one of FIG. 17, may be used for other data streams, such as an audio stream. At the end of the pipeline, there is the rendering engine (Audio/Video Playback 30). The rendering engine takes the frame provided in a raw YUV format when outputted by the video pipeline and displays it on the monitor. Prior to entering the pipeline, user selector of authorized segments and composition module 21 provided composition parameters to indicate the type of stream (video, audio, etc.) that are to be rendered with the codec to use (H.264, MPEG-4, etc.). At the beginning of the pipeline, composition instruction compiler module 25 receives RTP packets and reassembles them in groups to obtain a frame at step P1. Once the frame is assembled, composition instruction compiler module 25 looks for the first key frame close to the playback time which is a complete frame independent from the rest of the stream. If an offset is to be applied at step P2, composition instruction compiler module 25 searches for a key frame close to the playback time plus or minus the offset as specified in the composition parameters. Once the key frame is identified, composition instruction compiler module 25 checks if it must be decrypted at step P3. If this is the case, composition instruction compiler module 25 verifies if the user certificate is available at step P4 then it uses the stream decoding module 27 associated with the decryption algorithm needed at step P5. For the first decryption phase, because the user-specific key segment is asymmetrically encrypted using the user's public key, composition instruction compiler module 25 instantiates the stream decoding module 27 that provides access to the Crypto Application Programming Interface (API) of the Windows operating system to decrypt the user-specific key segment using the RSA algorithm at step P6. The result of this process is the user-specific key segment that is now unencrypted. Composition instruction compiler module 25 then locates in this unencrypted key segment the specific symmetric key required to decrypt the key frame. For this second phase composition instruction compiler module 25 instantiates the stream decoding module 27 that provides access to the Crypto API of the Windows operating system to decrypt the source frame using the AES algorithm. Once decrypted, the frame has the RTP transport layer headers removed and the remaining data is analyzed for integrity and to ensure that there is no packet missing, these tasks performed, for example, by the Secure Real-time Transport Protocol (SRTP) provided by a third-party library. This yields a real video frame (e.g. H.264) that can be sent to the decoder.

Composition instruction compiler module 25 checks if the required decoder is available for the type of frame to render at step P7. It will be understood that even though the exemplary process is described for a H.264 video frame, the same process may be applied for any standard or proprietary format, as long as a stream decoding module 27 is provided to handle the type of frame. For example, each video format supported by the fusion player application will have its video decoder available: H.264, MPEG-4, MJPEG, HEVC, etc. This is also applicable to audio formats: AAC, G711, G723, GSM0610, MPGA, etc. For internationally known video standards, existing codecs can be used (e.g. Windows Media Codecs, FFmpeg AvCodec, DivX). With such codecs the frame is in system memory. Decoders provided by graphic cards (NVidia, Intel) can also be used. In such cases the frame is in video memory. If the needed decoder is available, composition instruction compiler module 25 instantiates the corresponding stream decoding module 27 to decode the frame at step P8. For proprietary frame formats, in the case of masking overlays for example, a proprietary decoder is implemented to extract the necessary information. Such a proprietary decoder interprets the frame information and converts it in commands supported by audio/video playback module 30. For example, audio/video playback module 30 will interpret the masking overlay frame as being a rectangle with a specific size and position. Stream decoding module 27 will extract the shape (e.g. rectangle) having a length of L pixels and a height of H pixels, which is filled with a black color, and follows its position is defined by X and Y pixels from the bottom left of a window. This system of coordinates is provided as an example. Any system of coordinates can be used as long as the rendering engine 30 (e.g. audio/video playback module) uses the same system. Subsequent frames received for the masking overlay stream may result in L, H, X, and Y to vary over time to follow the video frame to which it is fused. In the example of the video frame, once decoded, composition instruction compiler module 25 obtains from stream decoding module 27 a raw video frame in the YUV format that is outputted from the pipeline at the exact time that it needs to be displayed by the rendering engine 30 (e.g. audio/video playback module). The composition instruction compiler module 25 then provides the video frame to audio/video playback module 30 for display. Audio/video playback 30 gets the frame and can apply some transformations if needed. The audio/video playback module 30 can apply a dewarping transformation in case the video frame belongs to a fish-eye camera. In some cases, the audio/video playback module 30 can apply a rotation transformation, it can apply a zoom transformation following user commands, or it can convert the color format to obtain an image that is compatible with the display framework. The audio/video playback module 30 then provides, at the exact time it must be displayed, the raw image to the Windows Presentation Foundation (WPF) display framework, which in turn uses DirectX to display the image on the monitor.

If, for example, there is also a masking overlay segment that is to be fused with the video segment, the same pipeline will apply to the overlay frame. If needed the overlay frame will be decrypted and decoded to extract the information about the overlay itself; that is, the shapes and the properties that are to be drawn on the display. Having received the shapes and their properties from stream decoding module 27, in the equivalent of the transformation process performed on the video frame, composition instruction compiler module 25 draws the shapes with their properties (size, position, contour color, fill color, etc.) by sending commands to audio/video playback module 30. By configuration, audio/video playback module 30 provides an overlay layer to draw the shapes and automatically controls the z-order to display the overlay layer over the video layer. Audio/video playback module 30 provides an interface to composition instruction compiler module 25 to draw polygons and lines, set their size and position, specify the contour color and the fill color. As for the composition instruction compiler module 25, the rendering engine or audio/video playback module 30 provides the control needed for a designated security monitoring system. Performing the final rendering of the video and overlay images may rely on the WPF framework which in turns relies on DirectX. In some other embodiments, a non-preferred example may be to modify the video frames to add the shapes and then re-encode the image with a standard format such as MPEG-4 that is supported by the off-the-shelf video player. However, this example results in an undesirable a loss of scalability and requires modifying the source frames. In some embodiments, an exemplary fusion stream player 30 may support the G64X proprietary file format to read and decode the elementary streams that compose the fusions streams stored in the file, and play the scenario right from the storage.

The next step performed by composition instruction compiler module 25 is to check if a fusion must be done between two or more frames at step P9. In one example, the source frame is the image to be displayed and the fused frame is the overlay image. The fusion of these two frames is commanded by user selector of authorized segments and composition module 21 through the composition parameters. If there is only the video frame to render (no fused frame), composition instruction compiler module 25 simply provides the video image to audio/video playback module 30 for rendering as described above at step P10A. If there is a fused frame, composition instruction compiler module 25 ensures that the video frame and the overlay frame are rendered synchronously by audio/video playback module 30 although the two frames are not provided using the same interface at step P10B. A person skilled in the art will understand that the interfaces of the audio/video playback module 30 are the ones provided by the known WPF framework on Microsoft Windows platforms for rendering images and other types of visible objects on a display.

Other Possible Applications

The great flexibility provided by fusion streams can simplify the implementation of many future applications not invented yet. The JSON (or XML or other) markup format used to define fusion streams allow tags to be easily added to adapt to new requirements. If new tags (also called composition attributes) are not supported by the player, it can simply ignore them and still continue to replay the scenario using the tags it supports. The player can then be updated later to support the new tags, providing a greater flexibility when deploying system updates. Example of new tags could be:

More Tag Examples

"attached-note": "The suspect is known to us.",
"attached-file": "//server/suspects/person_X/photos/20120506-pic1.png",
"bookmark-name": "Suspect entering bus",
"bookmark-desc": "This is the time when the main suspect enters the bus",
"bookmark-time": "2015-09-20 15:00", The power of fusion streams also resides in the capability to modify its composition after it was created and elementary streams were recorded, to change users' permissions to access an entire stream or a part of it, and to provide a versioning mechanism that keeps track of changes.

New metadata stream formats can also be easily added to existing fusion streams without having to rework its structure. For example, it may be desirable to create a new stream format containing overlays displayed over a video stream. Overlays can contain geometric shapes with shape type, color, texture, size and position attributes. Because a standard format that can meet all requirements rarely exists, it can be necessary to create a new stream format. Such a metadata stream can be then referenced by fusion streams without having to modify their structure. As long as the player knows how to decode the new stream and to use the composition attributes provided, the structure of the fusion stream does not need to be modified and such new content can easily be stored.

It should be appreciated that streams are not limited to video. Any logical composition of timestamped data coming from different sources may be used for fusion streams.

Social Media

Fusion streams can be applied to social media for example. For instance, there may be a need to aggregate data from some social media that matches certain criteria (geo-location, date & time coverage, post content, etc.), (i.e. the logical scenario) where a fusion stream may be created for that purpose.

A fusion stream is a versioned composition of elementary streams, where it may be presumed that each user on a given social media is a unique source of an elementary stream. Because it is possible to derive an elementary stream from another elementary stream, a new elementary stream corresponding to an anonymized version of a social media source, matching the logical scenario, may be created. The original (i.e. non-anonymized version) of that stream can be encrypted using, for example, the fusion stream encryption. This may also generate a certificate-specific key stream for that original stream.

Ultimately, the fusion stream would contain, for all social media sources (i.e. a given user) that matches our logical scenario (a given stream of posts from that user on this social media):

- The original social media data stream (encrypted with a sequence of randomly generated symmetric keys).
- A certificate specific key stream (i.e. the sequence of symmetric keys used to encrypt the original stream further encrypted with the public key of an entity that may be authorized to decrypt the original stream or give viewing permissions (integrally or in part) to others).
- The anonymized version of the stream (unencrypted).

Newspapers

Newspapers may also be modeled using fusion streams. A given publication (e.g. the New York Times) can be the logical scenario (i.e. the fusion stream). A publication is a collection of digital content (e.g. articles, chronicles). Individual articles come from the elementary stream of their writer (unique sources). This allows them to live outside that scenario and can potentially be reused in another publication (i.e. another fusion stream).

As the publication may be translated as a logical composition of data streams, the representation of the elementary streams (e.g. the author, the publisher, the agency) may be changed depending on specific needs.

In some embodiments, the newspaper model may also be coupled with the fusion stream encryption described in US patent application, defining a digital subscription model with a desired granularity. In this publication subscription example, a key steam may have an expiration period (e.g. full access until a given date where the keystream will be deleted) or take the form of a sliding window (e.g. giving access to the last X days of data).

License Plate Recognition

The fusion stream can be used as a data structure by License Plate Recognition (LPR) systems to store the plate reads from a capture device. There can be one fusion stream for the whole device, wherein one elementary stream can be created for each sensor available on the device. For example, this can be useful when a capture device (e.g. LPR camera) provides two types of sensors, hence two different types of images (context color image and infrared plate image) per plate read. Each image stream may then be stored in an elementary stream composing the fusion stream representing the capture device.

Body Wearable Cameras

Systems managing Body Wearable Cameras (BWC) can also use fusion streams. Such systems can use the logical grouping capability offered by fusion streams since a single camera can be used by an officer one day and another officer the next day. However, in some examples, in order to track all recordings associated with a given officer regardless of the camera that is used, there would be one fusion stream (i.e. logical scenario) per user, each fusion stream having elementary streams associated with different body wearable cameras. Fusion streams can also be used for conversion where an MP4 stream (original format from the BWC) is received and create a new track G64 (proprietary format) handled by the security monitoring system, both the original and the converted streams being part of the same fusion stream.

Motion Blurring

A motion blurring feature can also use fusion streams to record, store, and manage the data it generates. The video stream can be fed to one motion detection algorithm that will produce a new stream (a motion mask stream) which will be recorded as another elementary stream added to the fusion stream which represents the logical scenario of the scene requiring the masking of certain of its portions. The motion mask can be applied on the raw video on the client side (e.g. during a playback at the workstation), but it can also be possible to remove the mask if the user (e.g. an investigator) has the proper permissions to see the unmasked scene. The same logic can be used with any type of overlays.

Video Analytics

Metadata generated from video analytics systems can also be stored using fusion streams. In such cases the logical scenario can be represented by the scene which is recorded by a video camera. Using elementary streams, the video analytics metadata can be added to the fusion stream after the video was already recorded and stored. With fusion streams, it is easy to add new streams to an existing logical scenario. Those streams can in turn allow forensic search and analysis which could in turn generate new streams of results that are part of the same scenario.

Fusion Stream Application Programming Interface

Figure 14:
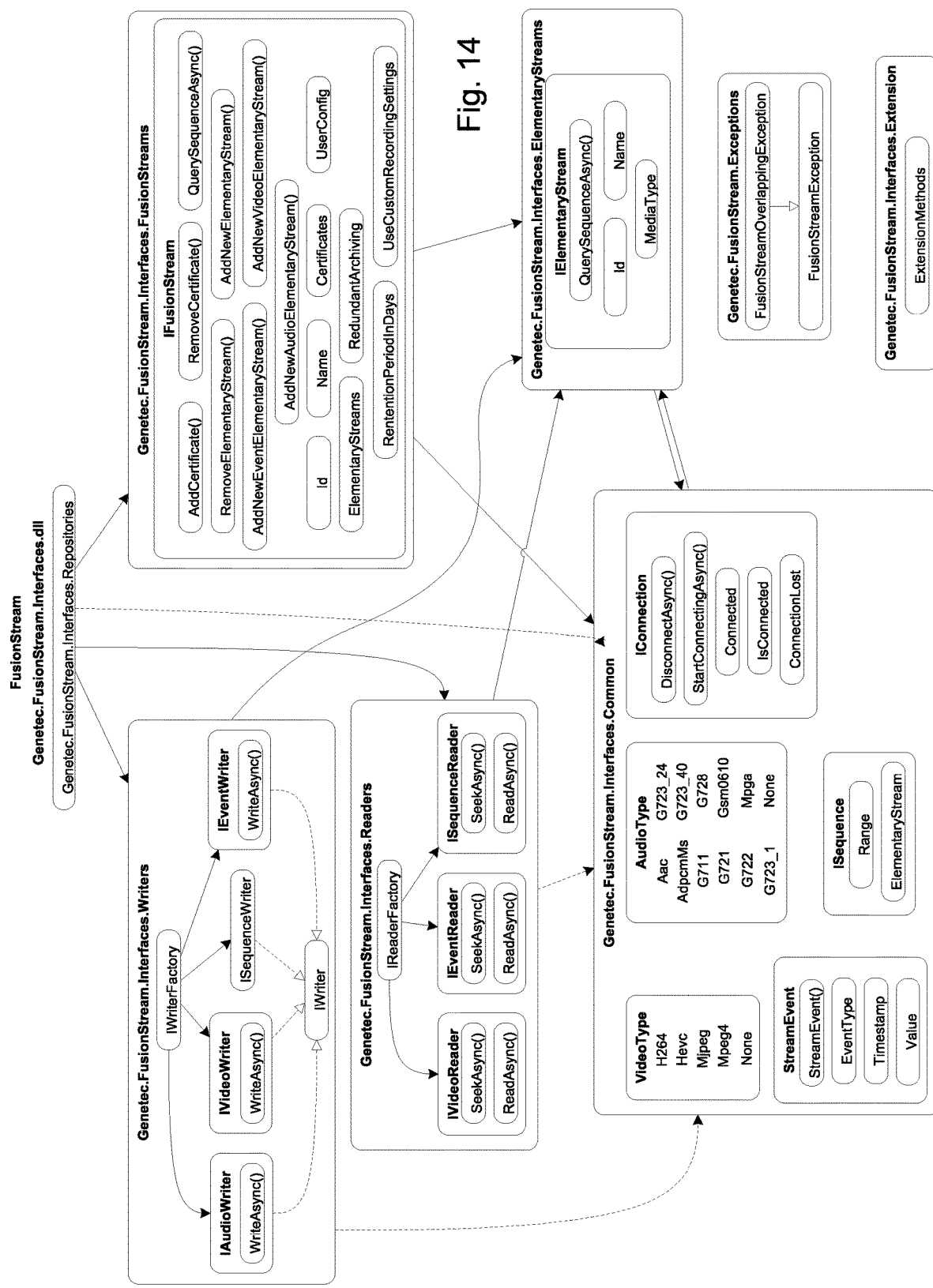
FIG. 14 is a schematic diagram showing an exemplary definition of the fusion stream programming interface.

FIG. 14 provides a graphical view of the application programming interface (API) developed to allow writer/generator and reader/player applications to manipulate fusion streams according to their needs. In one example, the API is built on the Microsoft .NET framework and is written in C#. There are different sections of the API on the Fusion Stream:

1—Repository
2—Fusion Streams
3—Elementary streams
4—Sequence Readers
5—Sequence Writers Getting the Repository The repository is the main gate to access the fusion stream. In order to get the repository, the user uses the FusionStreamRepositoryFactory.

```
public static IFusionStreamRepository Get(Guid owner, Guid
    archiverRole, IDatastoreProxy proxy)
```

Parameters:
owner: GUID of the owner. In some examples, it will be the GUID of the client application using the fusion stream. It could also be a random GUID that can be used to compartmentalize different groups of fusion streams. All streams created under owner A will only be visible when getting the repository of owner A.
archiverRole: Fusion Archiver that maintains the fusion stream repository.
proxy: Communication module that controls access to different components within the system.

Repository Interface

Once the repository is obtained, access is given to the IFusionStreamRepository interface:

```
public interface IFusionStreamRepository : IConnection
{
    Task<bool> UpdateAsync(CancellationToken ct);
    IFusionStream CreateFusionStream(Guid id, string name);
    bool DeleteFusionStream(Guid id);
    IReadOnlyCollection<IFusionStream> FusionStreams { get; }
    Task<IEnumerable<ISequence>> QuerySequencesAsync(IDateTimeRange boundaries,
        IEnumerable<Guid> fusionStreamFilter = null);
    Task<bool> ProtectFusionStreamAsync(Guid fusionStreamGuid, DateTimeRange
        protectionRange, TimeSpan protectionLength);
    Task<bool> UnprotectFusionStreamAsync(Guid fusionStreamGuid, DateTimeRange
        protectionRange);
    IWriterFactory GetWriterFactory( );
    IReaderFactory GetReaderFactory( );
}
```

UpdateAsync: Commits the changes made to the fusion and elementary streams. Returns true when success and false otherwise (for example when the connection is dropped).

CreateFusionStream: Creates a new fusion stream. Changes are only applied after calling UpdateAsync. Returns the IFusionStream interface.

DeleteFusionStream: Deletes the fusion stream and all the underlying elementary streams.

FusionStreams: Collection of existing fusion streams.

QuerySequencesAsync: Returns the list of sequences for the specified time range and filtered by fusion streams or all fusion streams if no filter is specified.

ProtectFusionStreamAsync: Protects all the sequences of the specified fusion stream's elementary streams during the time range specified, for the desired duration.

UnprotectFusionStreamAsync: Unprotects sequences for the specified time range previously protected by ProtectFusionStreamAsync.

GetWriterFactory: Gets the factory for creating sequence writers for the elementary streams.

GetReaderFactory: Gets the factory for creating readers for the elementary streams sequences.

Fusion Stream Interface

The IFusionStream interface is used to manipulate the fusion stream's attributes and elementary streams relationships. All changes made on the configuration of the fusion stream are applied after the UpdateAsync method is called on the repository.

```
public interface IFusionStream
{
    Guid Id { get; }
    string Name { get; set; }
    string UserConfig { get; set; }
    IReadOnlyCollection<X509Certificate2> Certificates { get; }
    IReadOnlyCollection<IElementaryStream> ElementaryStreams { get; }
    int RetentionPeriodInDays { get; set; }
    bool RedundantArchiving { get; set; }
    bool UseCustomRecordingSettings { get; set; }
    IElementaryStream AddNewElementaryStream(Guid id, string name, Guid mediaType);
    IElementaryStream AddNewAudioElementaryStream(Guid id, string name);
    IElementaryStream AddNewVideoElementaryStream(Guid id, string name);
    IElementaryStream AddNewEventElementaryStream(Guid id, string name);
    bool RemoveElementaryStream(Guid id);
    void AddCertificate(X509Certificate2 certificate);
    bool RemoveCertificate(X509Certificate2 certificate, bool revokeCertificate);
    Task<IEnumerable<ISequence>> QuerySequencesAsync(IDateTimeRange boundaries,
        IEnumerable<Guid> elementaryStreamFilter = null);
}
```

Id: GUID of the fusion stream.

Name: Name of the fusion stream.

UserConfig: User configurable content for the specific fusion stream, such as a description.

Certificates: List of X.509 certificates associated to the fusion stream for encryption purposes.

ElementaryStreams: Collection of elementary streams belonging to the current fusion stream.

RetentionPeriodInDays: Configurable value for retention of sequences before they are automatically deleted.

RedundantArchiving: Specify if the fusion stream should be archived by multiple archivers depending on the failover configuration of the system.

UseCustomRecordingSettings: A true value indicates to use a specific configuration for the fusion stream. False indicates to use the archiver configuration.

AddNewElementaryStream: Creates a new elementary stream under the fusion stream.

AddNewAudioElementaryStream: Creates a new elementary stream of specific audio media type under the fusion stream.

AddNewVideoElementaryStream: Creates a new elementary stream of specific video media type under the fusion stream.

AddNewEventElementaryStream: Creates a new elementary stream of specific event media type under the fusion stream.

RemoveElementaryStream: removes the elementary from the fusion stream and deletes underlying sequences.

AddCertificate: Adds encryption certificate to the fusion stream. All new sequences added will be encrypted with all the certificates on the list.

RemoveCertificate: Removes certificate from the fusion stream.

QuerySequencesAsync: Returns the list of sequences for the specified time range and filtered by elementary streams or all elementary streams if no filter is specified.

Elementary Stream Interface

The IElementaryStream interface provides the information associated with a specific elementary stream.

```
public interface IElementaryStream
{
    Guid Id { get; }
    string Name { get; set; }
    Guid MediaType { get; }
    Task<IEnumerable<ISequence>>
        QuerySequencesAsync(IDateTimeRange boundaries);
}
```

Id: GUID of the elementary stream.

Name: Name of the elementary stream.

MediaType: Used to determine the underlying data type (e.g. generic, audio, video, events).

QuerySequencesAsync: Returns the list of sequences for the specified time range and for this specific elementary stream.

Writing Data to Fusion Streams

The IWriterFactory interface provides access to different kinds of sequence writers. The times used are adjusted to the SQL time. The extension method AdjustToSqlTime is applied to all times used on the interface.

```
public interface IWriterFactory
{
    Task<ISequenceWriter> AddNewSequence(IDateTimeRange range,
        IElementaryStream elementaryStream);
    Task<ISequenceWriter> AddNewLiveSequence(DateTime startTimestamp,
        IElementaryStream elementaryStream);
    Task<IEventWriter> AddNewEventSequence(IDateTimeRange range,
        IElementaryStream elementaryStream);
    Task<IEventWriter> AddNewLiveEvent(DateTime startTimestamp,
        IElementaryStream elementaryStream);
    Task<ISequenceWriter> AddNewVideoSequence(IDateTimeRange range,
        VideoType compressionType, IElementaryStream elementaryStream);
    Task<ISequenceWriter> AddNewLiveVideo(DateTime startTimestamp,
        VideoType compressionType, IElementaryStream elementaryStream);
    Task<ISequenceWriter> AddNewAudioSequence(IDateTimeRange range,
        AudioType compressionType, IElementaryStream elementaryStream);
    Task<ISequenceWriter> AddNewLiveAudio(DateTime startTimestamp,
        AudioType compressionType, IElementaryStream elementaryStream);
}
```

AddNewSequence: Provides a sequence writer for a specified time range. If there is an overlap with an existing sequence the exception FusionStreamOver/appingException will be thrown.

AddNewLiveSequence: Same as before, but with an open-ended range (no stop time). Will throw exceptions on error.

Specific writers:

AddNewEventSequence: Provides a sequence writer for events and a specified time range. If there is an overlap with an existing sequence the exception FusionStream-Over/appingException will be thrown.

AddNewLiveEvent: Same as before, but with an open-ended range (no stop time). Will throw exceptions on error.

AddNewVideoSequence: Provides a sequence writer for video and a specified time range. If there is an overlap with an existing sequence an exception FusionStream-Over/appingException will be thrown.

AddNewLiveVideo: Same as before, but with an open-ended range (no stop time). Will throw exceptions on error.

AddNewAudioSequence: Provides a sequence writer for audio and a specified time range. If there is an overlap with an existing sequence an exception FusionStream-Over/appingException will be thrown.

AddNewLiveAudio: Same as before, but with an open-ended range (no stop time). Will throw exceptions on error.

Writer Base Class

The IWriter interface provides pause and resume functionalities when writing data to an elementary stream.

```
public interface IWriter : IConnection
{
    Task<bool> Pause(CancellationToken ct);
    Task<bool> Resume(DateTime time, CancellationToken ct);
}
```

Pause: Momentarily pauses the sequence writing, without closing the segment. It will insert a stop recording event on the archiver without closing the segment file.

Resume: Resumes writing on the same sequence without creating a new segment file. A start sequence is inserted, where there may be different segments for the same archive.

Generic Sequence Writer

The ISequenceWriter interface provides a basic writing interface.

```
public interface ISequenceWriter : IWriter
{
    Task<bool> WriteAsync(DateTime timestamp, byte[ ] data, bool
        isKeyFrame = true);
}
```

WriteAsync: Sends data to the archiver. The timestamp determines the frame's time. This time can be later used to recover the sequence with the reader. isKeyFrame: indicates if this should show or not as a result on the queries.

Event Writer

The IEventWriter interface allows some more flexibility when writing different types of events on a single elementary stream.

```
public interface IEventWriter : IWriter
{
    Task<bool> WriteAsync(StreamEvent streamEvent);
}
```

WriteAsync: Writes an event to the elementary stream.
StreamEvent Class:

```
public class StreamEvent
{
    public DateTime Timestamp { get; }
    public int EventType { get; }
    public string Value { get; }
    public StreamEvent(DateTime timestamp, int eventType, string
        value)
    {
        Timestamp = timestamp;
        EventType = eventType;
        Value = value;
    }
}
```

```
public override string ToString( )
{
    return $"TimeStamp: {Timestamp} EventType:
        {EventType} Value: {Value}";
}
}
```

Reading Data from the Fusion Stream

The IReaderFactory interface provides methods to get a specific reader matching the type used by the writer factory to read the sequence information.

```
public interface IReaderFactory
{
    ISequenceReader GetSequenceReader(IElementaryStream
        elementaryStream);
    IEventReader GetEventReader(IElementaryStream
        elementaryStream);
    ISequenceReader GetVideoReader(IElementaryStream
        elementaryStream);
    ISequenceReader GetAudioReader(IElementaryStream
        elementaryStream);
}
```

Sequence Reader

The ISequenceReader interface provides access to stored sequence data on the elementary stream.

```
public interface ISequenceReader : IConnection
{
    Task<bool> SeekAsync(DateTime seekTime, bool
        startsAtPreviousKeyFrame = false);
    Task<IBuffer> ReadAsync( );
}
```

SeekAsync: Fetches the desired frame position inside the segment.

ReadAsync: Read one frame from the position specified. Data might be offset on the returned buffer. In this case, valid data is found after the data offset.

Event Reader

The IEventReader interface provides a specialized reader that can read stream data with an event type filter.

```
public interface IEventReader : IConnection
{
    Task<bool> SeekAsync(DateTime seekTime, IEnumerable<int>
        eventTypeFilter = null);
    Task<StreamEvent> ReadAsync( );
}
```

SeekAsync: Fetches the desired frame position inside the segment.

ReadAsync: Read one frame from the position specified. If a filter is specified, only events included in the filter will be returned. Data might be offset on the returned buffer. In this case, valid data is found after the data offset.

Sequence Search Result

The ISequence interface provides the information returned by the QuerySequence method and allows to find when there is information stored and to which elementary stream the segment is associated.

```
public interface ISequence
{
    IDateTimeRange Range { get; }
    IElementaryStream ElementaryStream { get; }
}
```

Range: Time range contained on the segment.

ElementaryStream: Elementary stream to which the segment belongs.

Common Connection Interface

The IConnection interface is used to handle connection status for the repository, readers and writers.

```
public interface IConnection : IDisposable
{
    /// <summary>
    /// Starts the connection process
    /// </summary>
    /// <param name="ct"></param>
    /// <returns>true if connected succesfully.Will return false and
retry by itself if failed.</returns>
    Task<bool> StartConnectingAsync(CancellationToken ct);
    /// <summary>
    /// Disconnect. Will close the sequence when used on a
    writer/reader
    /// </summary>
    /// <param name="ct"></param>
    /// <returns></returns>
    Task<bool> DisconnectAsync(CancellationToken ct);
    /// <summary>
    /// Useful when StartConnectingAsync fails
    /// </summary>
    event EventHandler<EventArgs> Connected;
    event EventHandler<EventArgs> ConnectionLost;
    bool IsConnected { get; }
}
```

StartConnectingAsync: Starts the connection process. Will only return when connected. Returns false if canceled.

DisconnectAsync: Disconnects the underlying connection. Will only return when fully disconnected. Returns false if canceled.

Connected: Event fired when connected or reconnected.

ConnectionLost: Event fired when disconnected manually or automatically.

IsConnected: Gets the current connection status.

Mapping of the Conceptual Methods with the Real Fusion Stream API

The following conceptual methods may be used to present the interface to fusion streams in a more descriptive manner:

GetFusionStreamInfo(guid FusionID, int CompositionVersion)

GetFusionStreamComposition(guid FusionID, DateTime StreamingTime, int CompositionVersion)

GetStreamInfo(guid StreamiD)

GetStreamSegments(guid StreamiD, DateTime FromDateTime, DateTime ToDateTime)

These methods can be mapped to the fusion stream API methods as follows.

GetFusionStreamInfo(guid FusionID, int CompositionVersion)

The following is to obtain a IFusionStream object using a given fusion stream GUID: fsguid.

```
// Get the repository and connect to the archiver
var repository = FusionStreamRepositoryFactory.Get(
    Guid.NewGuid( ), Context.As<ArchiverContext>(
    ).ArchiverManager.RoleId,
    DatastoreProxy);
CancellationToken ct = new CancellationToken( );
await repository.StartConnectingAsync(ct);
// Retrieve the fusion stream using provided guid: fsguid
IFusionStream fsObject = repository.FusionStreams.FirstOrDefault(x =>
x.Id == fsguid)
```

GetFusionStreamComposition(guid FusionID, DateTime StreamingTime, int CompositionVersion)

This method is mapped to the following method of the IFusionStream object:
IReadOnlyCollection<IElementaryStream>ElementaryStreams {get;}
GetStreamInfo(guidStreamID)

Retrieve the elementary stream using the provided identifier eguid from fsObject.

IElementaryStream
eStream=fsObject.ElementaryStreams.FirstOrDefault
(x=>x.Id==eguid)

GetStreamSegments(guid StreamID, Date Time FromDateTime, Date Time ToDateTime)

Use the following method on an elementary stream (e.g. eStream object) to get a list of its segments:

```
// Query sequences will return the last sequences that was added.
var sequences = eStream.QuerySequencesAsync(new
    DateTimeRange(DateTime.MinValue,
        DateTime.MaxValue)).Result.ToList( );
```

Code Samples

The code samples provided herein provide a quick demonstration on how to use the fusion stream API to create basic connections and write and read data.

```
// Get the repository and connect to the archiver
var repository = FusionStreamRepositoryFactory.Get(
        Guid.NewGuid( ), Context.As<ArchiverContext>( ).ArchiverManager.RoleId,
        DatastoreProxy);
CancellationToken ct = new CancellationToken( );
await repository.StartConnectingAsync(ct);
Guid fsId = Guid.NewGuid( );
Guid esId = Guid.NewGuid( );
// Create Fusion and Elementary streams
var fs = repository.CreateFusionStream(fsId, "FusionTest");
var es = fs.AddNewElementaryStream(esId, "StreamTest", Guid.NewGuid( ));
var result = await repository.UpdateAsync(ct);
// Get a writer and connect
var start = new DateTime(2016, 1, 1, 8, 0, 0);
var end = new DateTime(2016, 1, 1, 8, 1, 0);
DateTimeRange range = new DateTimeRange(start, end);
var writer = repository.GetWriterFactory( ).AddNewSequence(range, es).Result;
await writer.StartConnectingAsync(ct);
// Send some data to the writer
int size = 20000;
var data = new byte[size];
for(int pos = 0; pos < size; pos += sizeof(int))
    Array.Copy(BitConverter.GetBytes(1234), 0, data, pos, sizeof(int));
int nbBufferSent = 0;
for(var frameTime = start; frameTime <= end; frameTime += TimeSpan.FromSeconds(1))
{
    ++nbBufferSent;
    await writer.WriteAsync(frameTime, data);
}
await writer.DisconnectAsync(ct);
// Query sequences. Sequences just written before will be available,
var sequences = es.QuerySequencesAsync(new DateTimeRange(DateTime.MinValue,
        DateTime.MaxValue)).Result.ToList( );
// Create reader and connect
var readerFactory = repository.GetReaderFactory( );
var reader = readerFactory.GetSequenceReader(es);
await reader.StartConnectingAsync(ct);
// Seek to the beginning of the sequence and read all frames
result = await reader.SeekAsync(sequences[0].Range.StartTime);
int nbBufferRead = 0;
for(var frameTime = start; ; frameTime += TimeSpan.FromSeconds(1))
{
    var readBuffer = await reader.ReadAsync( );
    if(readBuffer == null || readBuffer.DataSize == 0)
        break;
    ++nbBufferRead;
    readBuffer.Release( );
}
// nbBufferSent and nbBufferRead should now be the same
```

The code sample below demonstrates how to write audio and video data to a fusion stream.

```
var repository = FusionStreamRepositoryFactory.Get(
                Guid.NewGuid( ), Context.As<ArchiverContext>( ).ArchiverManager.RoleId,
                DatastoreProxy);
CancellationToken ct = new CancellationToken( );
repository.StartConnectingAsync(ct).Wait(ct);
// Create a Fusion Stream and 2 Elementary streams, one for audio one for video
Guid fsId = Guid.NewGuid( );
Guid videoId = Guid.NewGuid( );
Guid audioId = Guid.NewGuid( );
var fs = repository.CreateFusionStream(fsId, "FusionTest");
var esVideo = fs.AddNewVideoElementaryStream(videoId, "StreamTestVideo");
var esAudio = fs.AddNewAudioElementaryStream(audioId, "StreamTestAudio");
var result = repository.UpdateAsync(ct).Result;
// Custom objects that return video or audio frames from a file
var videoFileReader = VideoFileReader.OpenFile("VideoFile");
var audioFileReader = AudioFileReader.OpenFile"AudioFile");
DateTimeRange range1 = new DateTimeRange(videoFileReader.StartTimeUtc.AdjustToSqlTime( ),
                videoFileReader.EndTimeUtc.AdjustToSqlTime( ));
DateTimeRange range2 = new DateTimeRange(AudioFileReader.StartTimeUtc.AdjustToSqlTime( ),
                videoFileReader.EndTimeUtc.AdjustToSqlTime( ));
var videoWriter = repository.GetWriterFactory( ).AddNewVideoSequence(range1, VideoType.H264,
                esVideo).Result;
var audioWriter = repository.GetWriterFactory( ).AddNewAudioSequence(range2, AudioType.G711,
                esAudio).Result;
// Connect to the video and audio writers and push all the data, then disconnect
videoWriter.StartConnectingAsync(ct).Wait(ct);
audioWriter.StartConnectingAsync(ct).Wait(ct);
foreach(var frame in videoFileReader.Frames)
{
    var frameTime = frame.Timestamp.AdjustToSqlTime( );
    result = videoWriter.WriteAsync(frameTime, frame.Data, frame.IsKeyFrame).Result;
};
foreach(var frame in audioFileReader.Frames)
{
    var frameTimeSent = frame.Timestamp.AdjustToSqlTime( );
    result = audioWriter.WriteAsync(frameTime, frame.Data, frame.IsKeyFrame).Result;
};
videoWriter.DisconnectAsync(ct).Wait(ct);
audioWriter.DisconnectAsync(ct).Wait(ct);
// Query sequences will return the last sequences that was added.
var videoSequences = esVideo.QuerySequencesAsync(new DateTimeRange(DateTime.MinValue,
                DateTime.MaxValue)).Result.ToList( );
var audioSequences = esAudio.QuerySequencesAsync(new DateTimeRange(DateTime.MinValue,
                DateTime.MaxValue)).Result.ToList( );
// Create a reader and get all data
var readerFactory = repository.GetReaderFactory( );
var videoReader = readerFactory.GetVideoReader(esVideo);
var audioReader = readerFactory.GetAudioReader(esAudio);
result = videoReader.StartConnectingAsync(ct).Result;
result = videoReader.SeekAsync(
                videoFileReader.Header.StartTimeUtc.Value.AdjustToSqlTime( )).Result;
result = audioReader.StartConnectingAsync(ct).Result;
result = audioReader.SeekAsync(
                audioFileReader.Header.StartTimeUtc.Value.AdjustToSqlTime( )).Result;
int nbVideoBufferRead = 0;
int nbAudioBufferRead = 0;
do
{
    var buffer = videoReader.ReadAsync( ).Result;
    if(buffer != null)
    {
        ++nbVideoBufferRead;
        buffer.Release( );
    }
}while(buffer != null);
do
}
    var buffer = audioReader.ReadAsync( ).Result;
    if(buffer != null)
    {
        ++nbAudioBufferRead;
        buffer.Release( );
    }
} while(buffer != null);
```

```
// nbVideoBufferSent / nbVideoBufferRead, The number of video buffer written should be
// the same as the number of buffer read.
// nbAudioBufferSent / nbAudioBufferRead, The number of audio buffer written should be
// the same as the number of buffer read.
```

What is claimed is:

1. A computer-implemented method for rendering a fusion stream, the method comprising:
- accessing a fusion stream stored in data storage, the fusion stream comprising a plurality of fusion nodes identifying data segments of a plurality of elementary streams, each fusion node of the plurality of fusion nodes comprising a timestamp and at least one identifier of a data segment applicable at the timestamp, each elementary stream of the plurality of elementary streams corresponding to one or more data segments;
- receiving, via a user interface, a selection of a viewing time for playback of the fusion stream;
- retrieving, from the data storage, a fusion node of the plurality of fusion nodes for the viewing time based on the viewing time and the timestamp of the fusion node;
- retrieving, from media storage, at least one data segment, from among the data segments, identified by the fusion node for the viewing time; and
- processing the at least one data segment identified by the fusion node to generate a rendering of the fusion stream for the viewing time for playback;
- wherein the fusion stream comprises permission information; and wherein the method further comprises confirming that a user requesting access to the fusion stream is authorized to at least in part access the plurality of elementary streams based on the permission information.

2. The method of claim 1, wherein the fusion node for the viewing time comprises a plurality of identifiers for a plurality of data segments applicable at the timestamp of the fusion node, each data segment of the plurality of data segments identified by the fusion node corresponding to different ones of the plurality of elementary streams.

3. The method of claim 2, wherein retrieving the at least one data segment comprises retrieving, from the media storage, the plurality of data segments identified by the fusion node; and wherein processing the at least one data segment comprises processing the plurality of data segment identified by the fusion node to generate the rendering of the fusion stream for playback for the viewing time.

4. The method of claim 3, wherein at least two data segments of the plurality of data segments are synchronized for playback at least in part at a same time during the playback of the rendering of the fusion stream.

5. The method of claim 4, wherein processing the plurality of data segment comprises synchronizing the plurality of data segments identified by the fusion node according to timestamps of the plurality of data segments.

6. The method of claim 5, wherein at least two data segments of the plurality of data segments are synchronized according to the timestamps of the at least two data segments for simultaneous playback occurring at least in part at a same time during the playback of the rendering of the fusion stream.

7. The method of claim 6, wherein the timestamps of the plurality of data segments comprise a start time timestamp and an end time timestamp for each data segment of the plurality of data segments identified by the fusion node.

8. The method of claim 1, wherein the plurality of elementary streams comprises a first elementary stream corresponding to a first plurality of data segments.

9. The method of claim 8, wherein the first plurality of data segments of the first elementary stream are from a first source device.

10. The method of claim 8, wherein each data segment of the plurality of data segments of the first elementary stream is identifiable by a respective fusion node of a sequence of fusion nodes of the plurality of fusion nodes.

11. The method of claim 8, wherein the plurality of elementary streams comprises a second elementary stream corresponding to a second plurality of data segments from a second source device different from the first source device; and wherein at least some fusion nodes of the plurality of fusion nodes comprise a respective first identifier of a respective first data segment of the first elementary stream and a respective second identifier of a respective second data segment of the second elementary stream.

12. The method of claim 1, wherein each fusion node of the plurality of fusion nodes comprises attributes comprising:
- a unique identifier;
- the timestamp; and
- a list identifying one or more data segments; and
- wherein each listing in the list comprises:
- an identifier of a corresponding data segment; and
- wherein the list includes the at least one identifier of the data segment applicable at the timestamp.

13. The method of claim 12, wherein the identifier of the corresponding data segment is a hash signature of the corresponding data segment.

14. The method of claim 12, wherein each listing in the list further comprises a hash signature of the corresponding data segment.

15. The method of claim 1, wherein accessing the fusion stream stored in data storage comprises accessing an index comprising a list of the plurality of fusion nodes.

16. The method of claim 1, wherein the at least one data segment corresponds to one or more data segments that are authorized to be accessed by the user requesting the playback of the fusion stream.

17. The method of claim 1, wherein the plurality of elementary streams comprises a first elementary stream and a second elementary stream, the first elementary stream corresponding to a plurality of data segments of a source device, the second elementary streams corresponding to an encryption key stream comprising a plurality of encryption keys, each encryption key of the second elementary stream is used in encrypting a respective data segment of the plurality of data segments of the first elementary stream.

18. The method of claim 17, wherein the fusion node for the viewing time comprises a plurality of identifiers for a plurality of data segments applicable at the timestamp of the fusion node; and wherein the plurality of data segments comprises a first data segment of the first elementary stream encrypted with a symmetric encryption key and a second data segment comprising the symmetric encryption key of the second elementary stream.

19. The method of claim 18, wherein the second data segment is encrypted with a public key, and wherein the method further comprises:
- decrypting the second data segment with a private key corresponding to the public key to obtain the symmetric encryption key; and
- decrypting the first data segment with the obtained symmetric encryption key; and
- wherein processing the at least one data segment to generate the rendering of the fusion stream comprises processing the first data segment once decrypted with the symmetric encryption.

20. The method of claim 1, wherein the viewing time is a time range comprising a start time and an end time.

21. The method of claim 20, wherein said retrieving, from the data storage, the fusion node comprises retrieving, from the data storage, at least two fusion nodes applicable for the time range.

22. The method of claim 1, wherein the fusion node is a first fusion node, and wherein the method further comprises:
- retrieving, from the data storage, a second fusion node of the plurality of fusion nodes, the second fusion node is next to the first fusion node in a sequence of fusion nodes of the plurality of fusion nodes;
- retrieving, from media storage, at least one second data segment identified by the second fusion node; and
- processing the at least one second data segment identified by the second fusion node to generate the rendering of the fusion stream.

23. A computer-implemented method for generating a fusion stream, the method comprising:
- generating a fusion stream and storing the fusion stream in data storage, the fusion stream comprising a plurality of fusion nodes identifying data segments of a plurality of elementary streams;
- receiving stream data corresponding to at least some of the plurality of elementary streams, the at least some of the plurality of elementary streams each corresponding to one or more data segments of a source device of one or more source devices; and
- generating the plurality of fusion nodes and storing the plurality of fusion nodes in data storage, each fusion node of the plurality of fusion nodes comprising a timestamp and at least one identifier of a data segment, from among the data segments, applicable at the timestamp;
- wherein each of the data segments is associated with permission information for retrieval of the one or more data segments and wherein the permission information is to confirm that a user requesting to render the fusion stream is authorized to access the data segments.

24. The method of claim 23, wherein generating the plurality of fusion nodes comprises associating the one or more data segments of each of the at least some of the plurality of elementary streams to the plurality of fusion nodes based on one or more timestamps of the one or more data segments.

25. The method of claim 24, wherein at least two data segments of a plurality of data segments identified by at least some of the plurality of fusion nodes have timestamps indicating that the at least two data segments simultaneously occur at least in part at a same time.

26. The method of claim 23, further comprising: receiving a command for creating the fusion stream; and selecting one or more of the plurality of elementary streams for the fusion stream based on the command.

27. The method of claim 23, wherein receiving the stream data comprises receiving the stream data from the one or more source devices.

28. The method of claim 23, wherein receiving the stream data comprises receiving the one or more data segments of each of the plurality of elementary streams from media storage.

29. The method of claim 23, further comprising receiving a request to modify the fusion stream to add an additional elementary stream to the plurality of elementary streams; and creating a new version of the fusion stream based on the request.

30. The method of claim 23, wherein each fusion node of the plurality of fusion nodes comprises attributes comprising:
- a unique identifier;
- the timestamp; and
- a list identifying one or more data segments; and
- wherein each listing in the list comprises:
- an identifier of a corresponding data segment; and
- wherein the list includes the at least one identifier of the data segment applicable at the timestamp.

31. The method of claim 30, wherein the identifier of the corresponding data segment is a hash signature of the corresponding data segment.

32. The method of claim 30, wherein each listing in the list further comprises a hash signature of the corresponding data segment.

33. The method of claim 23, wherein the plurality of elementary streams comprises a first elementary stream and a second elementary stream, the first elementary stream corresponding to a plurality of data segments, the second elementary streams corresponding to an encryption key stream comprising a plurality of encryption keys, each encryption key of the second elementary stream is used in encrypting a respective data segment of the plurality of data segments of the first elementary stream.

34. The method of claim 33, further comprising:
- encrypting each data segment of the plurality of data segments of the first elementary stream with a respective symmetric encryption key of a plurality of symmetric encryption keys; and
- encrypting each symmetric encryption key of the plurality of symmetric encryption keys with a public encryption key to generate the second elementary stream, wherein the plurality of encryption keys of the second elementary stream correspond to the plurality of symmetric encryption keys encrypted with the public encryption key.

35. The method of claim 23, wherein the plurality of fusion nodes comprises a first fusion node and a second fusion node, the second fusion node is next to the first fusion node in a sequence of fusion nodes of the plurality of fusion nodes, and wherein generating the plurality of fusion nodes comprises:
- generating the first fusion node to include a first timestamp and at least a first identifier of at least a first data segment applicable at the first timestamp; and
- generating the second fusion node to include a second timestamp and at least a second identifier of at least a second data segment applicable at the second timestamp, the second data segment following the first data segment of a same elementary stream of the plurality of elementary streams.

* * * * *